US010889392B2

(12) United States Patent
Noda

(10) Patent No.: US 10,889,392 B2
(45) Date of Patent: Jan. 12, 2021

(54) COVERED CONTAINER MANUFACTURING DEVICE AND BLISTER PACKAGING MACHINE

(71) Applicant: CKD Corporation, Aichi (JP)

(72) Inventor: Naohiko Noda, Aichi (JP)

(73) Assignee: CKD CORPORATION, Aichi (JP)

( * ) Notice: Subject to any disclaimer, the term of this patent is extended or adjusted under 35 U.S.C. 154(b) by 180 days.

(21) Appl. No.: 16/240,164

(22) Filed: Jan. 4, 2019

(65) Prior Publication Data
US 2019/0135463 A1    May 9, 2019

Related U.S. Application Data

(63) Continuation of application No. PCT/JP2017/006510, filed on Feb. 22, 2017.

(30) Foreign Application Priority Data

Jul. 14, 2016 (JP) .................................. 2016-139023

(51) Int. Cl.
B65B 7/26  (2006.01)
B65B 5/02  (2006.01)
(Continued)

(52) U.S. Cl.
CPC ................ B65B 7/26 (2013.01); B29C 53/02 (2013.01); B29C 53/84 (2013.01); B65B 5/024 (2013.01);
(Continued)

(58) Field of Classification Search
CPC .. B65B 7/26; B65B 5/024; B65B 5/04; B65B 7/164; B65B 9/045; B65B 47/02;
(Continued)

(56) References Cited

U.S. PATENT DOCUMENTS 2,687,157 A * 8/1954 Cowan .................... B29C 33/30
220/4.23
3,045,408 A * 7/1962 Rasmusson ............... B65B 7/26
53/377.2
(Continued)

FOREIGN PATENT DOCUMENTS

JP   H11-77819 A    3/1999
JP   2008-297008 A  12/2008
JP   2016-94207 A   5/2016

OTHER PUBLICATIONS

International Preliminary Report on Patentability issued in corresponding International Patent Application No. PCT/JP2017/006510, dated Jan. 24, 2019 (1 page).
(Continued)

*Primary Examiner* — Nathaniel C Chukwurah
*Assistant Examiner* — Lucas E. A. Palmer
(74) *Attorney, Agent, or Firm* — Osha Bergman Watanabe & Burton LLP

(57) ABSTRACT

A covered container manufacturing device for manufacturing a resin covered container that includes: a container main body; an outer cover portion that opens and closes the container main body; and a hinge portion that couples the container main body with the outer cover portion, and wherein the container main body, the outer cover portion and the hinge portion are integrally formed, the covered container manufacturing device including: an angle regulator that regulates a relative angle of the outer cover portion with respect to the container main body to a predetermined angle of less than 180 degrees, wherein the angle regulator comprises: a heater that comprises a heating portion that generates heat and heats the hinge portion; and a bender that bends
(Continued)

the outer cover portion relative to the container main body at the heated hinge portion, wherein the heater heats inside of the hinge portion.

15 Claims, 12 Drawing Sheets

(51) Int. Cl.
| | |
|---|---|
| *B65B 5/04* | (2006.01) |
| *B65B 7/16* | (2006.01) |
| *B65D 43/16* | (2006.01) |
| *B65D 51/20* | (2006.01) |
| *B29C 53/84* | (2006.01) |
| *B65B 47/04* | (2006.01) |
| *B29C 53/02* | (2006.01) |
| *B65B 9/04* | (2006.01) |
| *B65B 47/02* | (2006.01) |
| *B29L 31/00* | (2006.01) |
| *B29C 51/08* | (2006.01) |

(52) U.S. Cl.
CPC ............... *B65B 5/04* (2013.01); *B65B 7/164* (2013.01); *B65B 9/045* (2013.01); *B65B 47/02* (2013.01); *B65B 47/04* (2013.01); *B65D 43/162* (2013.01); *B65D 51/20* (2013.01); *B29C 51/08* (2013.01); *B29L 2031/7162* (2013.01); *B29L 2031/7164* (2013.01); *B65D 2251/0021* (2013.01); *B65D 2251/0093* (2013.01); *B65D 2251/10* (2013.01); *B65D 2301/20* (2013.01); *B65D 2517/0041* (2013.01); *B65D 2543/00203* (2013.01); *B65D 2543/00296* (2013.01); *B65D 2543/00537* (2013.01)

(58) Field of Classification Search
CPC ......... B29C 53/02; B29C 53/84; B29C 51/08; B65D 43/162; B65D 51/20
See application file for complete search history.

(56) References Cited

U.S. PATENT DOCUMENTS

| | | | | |
|---|---|---|---|---|
| 3,377,768 A * | 4/1968 | Burt | ...... | B65B 7/2871 53/485 |
| 3,550,352 A * | 12/1970 | Voorhis | ...... | B65B 7/26 53/377.3 |
| 3,668,048 A * | 6/1972 | Noguchi | ...... | B65B 7/26 156/498 |
| 3,795,265 A * | 3/1974 | Schurman | ...... | B65D 43/162 206/521 |
| 3,873,394 A * | 3/1975 | Pearl | ...... | B65B 61/26 156/353 |
| 3,893,566 A * | 7/1975 | Ross | ...... | B65D 43/161 220/258.2 |
| 4,002,417 A * | 1/1977 | Vecchiotti | ...... | B29C 53/04 425/385 |
| 4,036,675 A * | 7/1977 | Amberg | ...... | B29C 43/305 156/245 |
| 4,241,863 A * | 12/1980 | Faller | ...... | B65D 75/32 229/120.03 |
| 4,319,684 A * | 3/1982 | Backman | ...... | B65B 7/26 206/464 |
| 4,340,352 A * | 7/1982 | Hayberg | ...... | B29C 37/0014 249/58 |
| 4,351,630 A * | 9/1982 | Hayberg | ...... | B29C 33/442 249/58 |
| 4,371,494 A * | 2/1983 | Miller | ...... | A61F 13/04 264/522 |
| 4,401,229 A * | 8/1983 | Bell | ...... | B65D 43/168 220/258.3 |
| 4,807,425 A * | 2/1989 | Abrams | ...... | B65B 43/38 53/381.4 |
| 4,847,988 A * | 7/1989 | Eitzinger | ...... | B65B 7/2807 29/710 |
| 4,994,638 A * | 2/1991 | Iorns | ...... | B65D 81/027 219/732 |
| 5,070,599 A * | 12/1991 | Eitzinger | ...... | B65B 7/2807 29/705 |
| 5,201,163 A * | 4/1993 | Reil | ...... | B29C 51/00 53/410 |
| 5,298,273 A * | 3/1994 | Ito | ...... | A21B 5/026 426/138 |
| 5,302,227 A * | 4/1994 | Dalrymple | ...... | B65B 7/26 156/204 |
| 5,336,460 A * | 8/1994 | Hettinga | ...... | B29C 45/14336 264/251 |
| 5,356,071 A * | 10/1994 | Schmissrauter | ...... | B65D 5/4208 229/160 |
| 5,376,320 A * | 12/1994 | Tiefenbacher | ...... | A21D 2/14 264/50 |
| 5,501,758 A * | 3/1996 | Nitardy | ...... | B65D 5/20 156/198 |
| 5,551,210 A * | 9/1996 | Williamson | ...... | B65B 1/06 53/248 |
| 5,776,388 A * | 7/1998 | Andersen | ...... | B27N 3/002 264/45.5 |
| 5,945,053 A * | 8/1999 | Hettinga | ...... | E05D 1/02 264/171.13 |
| 6,041,957 A | 3/2000 | Janetos | | |
| 6,652,932 B1 * | 11/2003 | Koblitz | ...... | B65D 65/466 428/34.1 |
| 8,918,981 B2 * | 12/2014 | Seitel | ...... | B65B 7/2842 29/466 |
| 2001/0035424 A1 * | 11/2001 | Combe | ...... | B65D 43/169 220/835 |
| 2002/0053757 A1 * | 5/2002 | Andersen | ...... | B29B 17/0005 264/428 |
| 2003/0230582 A1 * | 12/2003 | Whitmore | ...... | B65D 43/162 220/507 |
| 2004/0164076 A1 * | 8/2004 | Baker | ...... | B65D 1/30 220/23.4 |
| 2004/0178540 A1 * | 9/2004 | Huisman | ...... | C08L 3/02 264/478 |
| 2005/0247029 A1 * | 11/2005 | Gulczynski | ...... | B65B 7/26 53/377.6 |
| 2006/0006578 A1 * | 1/2006 | Johnson | ...... | B29C 65/7861 264/242 |
| 2009/0193766 A1 * | 8/2009 | Dyke | ...... | B65B 7/26 53/476 |
| 2010/0203850 A1 * | 8/2010 | Norris | ...... | G08B 5/223 455/90.3 |
| 2011/0049154 A1 * | 3/2011 | Michalsky | ...... | B65D 11/02 220/288 |
| 2011/0240641 A1 * | 10/2011 | Huels | ...... | B29C 65/18 220/200 |
| 2014/0024419 A1 * | 1/2014 | Norris | ...... | G08B 5/223 455/575.8 |
| 2014/0373330 A1 * | 12/2014 | Vanmechelen | ...... | B29C 51/306 29/428 |
| 2016/0059461 A1 * | 3/2016 | Altonen | ...... | B29C 45/0025 264/40.6 |
| 2017/0043913 A1 * | 2/2017 | Strachan | ...... | B65D 43/162 |
| 2017/0266873 A1 * | 9/2017 | Crosby | ...... | B29C 66/1312 |
| 2018/0222633 A1 * | 8/2018 | Baker | ...... | B29C 51/20 |

OTHER PUBLICATIONS

Written Opinion of the International Searching Authority issued in corresponding International Patent Application No. PCT/JP2017/006510, dated Jan. 24, 2019 (7 pages).

(56) References Cited

OTHER PUBLICATIONS

International Search Report for corresponding International Application No. PCT/JP2017/006510, dated Mar. 21, 2017 (5 pages).

* cited by examiner

COVERED CONTAINER MANUFACTURING DEVICE AND BLISTER PACKAGING MACHINE

BACKGROUND

Technical Field

The present invention relates to a covered container manufacturing device configured to manufacture a covered container that includes a container main body configured to place a predetermined article therein, an outer cover portion configured to open and close an opening of the container main body, and a hinge portion configured to couple the container main body with the outer cover portion and that is configured by integrally forming the container main body, the outer cover portion and the hinge portion, and to a blister packaging machine equipped with the covered container manufacturing device.

Description of Related Art

A known configuration of a blister pack to place any of various articles (for example, a food product or a medical product) therein has a resin covered container that includes a container main body configured to place the article therein, an outer cover portion configured to open and close an opening of the container main body, and a hinge portion configured to couple the container main body with the outer cover portion and that is configured by integrally forming the container main body, the outer cover portion and the hinge portion. The covered container is configured such that the opening of the container main body is repeatedly openable and closable by the outer cover portion.

A proposed configuration of a blister packaging machine used to manufacture such a blister pack includes a molding unit configured to cause a strip-shaped container film subject to a molding process and thereby form a part corresponding to the covered container; a conveyor unit configured to convey the container film in such a state that respective edges of the container film after molding are clamped by the conveyor unit; a placing unit configured to place the article into a part of the conveyed container film corresponding to the container main body; a cutting unit configured to cut out the covered container from the container film; and a fitting unit configured to bend the outer cover portion relative to the container main body at the hinge portion and fit the outer cover portion in the container main body, so as to cause the opening of the container main body to be closed by the outer cover portion (as described in, for example, Patent Literature 1).

CITATION LIST

Patent Literature

PTL 1: JP 2008-297008A

The above technique simply bends the outer cover portion to close the opening of the container main body but does not allow a relative angle of the outer cover portion to the container main body to be arbitrarily regulated in the state that closure of the container main body by the outer cover portion is released (for example, in the state that fitting of the outer cover portion in the container main body is released).

There is, in fact, a need to arbitrarily set the relative angle according to the usability, the usage environment, the shape of the covered container, the type of the article, and the like.

For example, in the case of manufacturing the blister pack (covered container) that enables the article to be readily taken out from the container main body, it may be desired to set a relatively large relative angle. In order to prevent abrupt rotation of the outer cover portion when the opening of the container main body is opened, to enhance the easiness of re-closing the opening of the container main body with the outer cover portion, and to improve the stability of the attitude of the covered container, on the other hand, it may be desired to set a relatively small relative angle.

SUMMARY

A covered container manufacturing device according to one or more embodiments of the present invention manufactures a covered container with an arbitrarily set relative angle of an outer cover portion relative to a container main body and enhances the convenience in use of the covered container, as well as a blister packaging machine.

Embodiments of the present invention are described. Functions and advantageous effects according to one or more embodiments of the present invention are also described as appropriate.

A covered container manufacturing device according to one or more embodiments of the present invention is configured to manufacture a resin covered container comprising a container main body configured to place an article therein; an outer cover portion configured to open and close an opening of the container main body; and a hinge portion configured to couple the container main body with the outer cover portion, wherein the container main body, the outer cover portion and the hinge portion are integrally formed. The covered container manufacturing device comprises an angle regulator configured to regulate a relative angle of the outer cover portion relative to the container main body to a predetermined angle of less than 180 degrees. The angle regulator comprises a heating unit equipped with a heating portion that generates heat and configured to heat the hinge portion by the heating portion; and a bending unit configured to bend the outer cover portion relative to the container main body at the heated hinge portion.

According to one or more embodiments described above, the covered container manufacturing device comprises the angle regulator equipped with the heating unit and the bending unit. This configuration produces the covered container with the relative angle of the outer cover portion to the container main body set to the predetermined angle of less than 180 degrees by regulating a heating degree of the hinge portion by the heating portion of the heating unit and by regulating a bending angle of the outer cover portion by the bending unit. This accordingly enhances the convenience in use of the covered container.

The covered container manufacturing device according to one or more embodiments may further comprise a support structure configured to support the covered container with the outer cover portion that is not bent relative to the container main body in such a state that the opening of the container main body faces up. The bending unit may be configured to bend the outer cover portion relative to the container main body in such a state that the covered container is supported by the support structure.

The configuration of one or more embodiments enables the outer cover portion to be bent, while the covered container is supported by the support structure. The outer cover portion can thus be bent in the more stable state. This configuration causes the relative angle of the outer cover portion to be set to a desired angle with high accuracy and more effectively prevents a variation in relative angle of the outer cover portion from occurring among the respective covered containers after bending.

In the covered container manufacturing device according to one or more embodiments, the bending unit may comprise a hinge holding structure configured to hold downward the hinge portion of the covered container supported by the support structure, when the outer cover portion is bent relative to the container main body.

According to one or more embodiments, the outer cover portion is bent, while the hinge portion is held by the hinge holding structure. This configuration enables the outer cover portion to be more reliably bent about the hinge portion as the center of rotation. This more reliably causes the hinge portion to be clearly "creased". As a result, the relative angle of the outer cover portion is set to a desired angle with the higher accuracy. This also more effectively prevents a variation in relative angle of the outer cover portion from occurring among the respective covered containers after bending.

In the covered container manufacturing device according to one or more embodiments, the bending unit may comprise a vertically moving bending unit configured to be linearly movable in a vertical direction and to press the outer cover portion of the covered container upward and bend the outer cover portion in such a state that the hinge portion of the covered container supported by the support structure is held downward by the hinge holding structure.

The configuration of one or more embodiments suppresses the covered container from being lifted up by the vertically moving bending unit and enables the outer cover portion to be more reliably bent about the hinge portion as the center of rotation.

The vertically moving bending unit is configured to be linearly moved. This simplifies the mechanism of the vertically moving bending unit and reduces the manufacturing cost. Moreover, this simplifies the operations of the vertically moving bending unit and enhances the operation stability of the vertically moving bending unit, thus improving the productivity.

In the covered container manufacturing device according to one or more embodiments, the bending unit may comprise a horizontally moving bending unit configured to be linearly movable in a direction intersecting with the moving direction of the vertically moving bending unit and to press the outer cover portion that is bent by the vertically moving bending unit and thereby bend the outer cover portion toward the opening of the container main body. The support structure may comprise a motion restrictor configured to restrict motion of the covered container along a pressing direction of the outer cover portion by the horizontally moving bending unit.

According to one or more embodiments, the motion restrictor provided in the support structure serve to restrict the motion of the covered container along the pressing direction in the process of pressing and bending the outer cover portion by the horizontally moving bending unit. This configuration accordingly enables the outer cover portion to be bent more precisely.

Additionally, the horizontally moving bending unit is configured to be linearly moved. This simplifies the mechanism of the horizontally moving bending unit and more effectively reduces the manufacturing cost. Moreover, this simplifies the operations of the horizontally moving bending unit and enhances the operation stability of the horizontally moving bending unit, thus further improving the productivity.

A common object may be used as the moving object of the vertically moving bending unit and the moving object of the horizontally moving bending unit. This further simplifies the mechanism and further reduces the manufacturing cost.

In the covered container manufacturing device according to one or more embodiments, the bending unit may be configured to keep the outer cover portion in a bent state relative to the container main body.

According to one or more embodiments, the bending unit enables the outer cover portion to be kept in the bent state relative to the container main body. For example, the bending unit causes the outer cover portion to be kept in the bent state corresponding to a target value of the relative angle, until the hinge portion is cooled down, and thereby causes the hinge portion to be clearly "creased". This causes the relative angle of the outer cover portion to be set to a desired angle with the higher accuracy. This also more effectively prevents a variation in relative angle of the outer cover portion from occurring among the respective covered containers after bending.

The covered container manufacturing device according to one or more embodiments may further comprise a receiving structure configured to receive the outer cover portion at a position opposed to the bending unit across the outer cover portion when the outer cover portion is kept in the bent state relative to the container main body by the bending unit.

According to one or more embodiments, the receiving structure more effectively prevents the outer cover portion from being kept in an excessively bent state. This accordingly causes the relative angle of the outer cover portion to be set to a desired angle with the higher accuracy. This also more effectively makes the relative angle uniform among the respective covered containers after bending.

There is provided a blister packaging machine configured to manufacture a blister pack. The blister pack is equipped with a resin covered container. The resin covered container comprises a container main body configured to place an article therein; an outer cover portion configured to open and close an opening of the container main body; and a hinge portion configured to couple the container main body with the outer cover portion, wherein the container main body, the outer cover portion and the hinge portion are integrally formed. The blister packaging machine comprises a molding unit configured to execute a molding process of a conveyed, strip-shaped container film and form a covered container-corresponding part corresponding to the covered container; a placing unit provided downstream of the molding unit and configured to place the article into a portion of the covered container-corresponding part that corresponds to the container main body; a punching unit provided downstream of the placing unit and configured to produce the covered container with the outer cover portion that is not bent relative to the container main body at the hinge portion by punching the covered container-corresponding part in the container film; and the covered container manufacturing device according to one or more embodiments, which the covered container produced by punching by the punching unit is supplied to.

The configuration of one or more embodiments basically has similar functions and advantageous effects described above.

Additionally, according to one or more embodiments, the covered container is produced by punching. This configuration enhances the flexibility of design with regard to the outer edge shape of the blister pack (or more specifically, the covered container), compared with a configuration that produces a covered container by a cutting unit configured to linearly move. In the process of producing the blister pack, the outer edge shape of the blister pack is formed to a desired shape by only punching. This eliminates a need to separately execute a process of rounding the corners and the like and thereby further improves the productivity.

In the blister packaging machine according to one or more embodiments, a resin inner cover film may be mounted to the container main body of the blister pack to close the opening of the container main body. The heating unit of the covered container manufacturing device may be configured to heat at least part of a mounting location of the container main body where the inner cover film is mounted, as well as the hinge portion by the heating portion.

According to one or more embodiments, the heating portion heats not only the hinge portion but the mounting location of the container main body where the inner cover film is mounted. Accordingly, heating the mounting location by the heating portion after mounting of the inner cover film enables the inner cover film to be more firmly mounted (fused) to the container main body. In some cases, the heating portion serves to mount (fuse) the inner cover film to the container main body. This eliminates a need to separately provide a sealing unit configured to mount the inner cover film to the container main body.

In the case where the inner cover film is mounted to the entire circumference of the opening of the container main body, the heating portion may be configured to heat the entire circumference.

In the blister packaging machine according to one or more embodiments, the covered container may comprise a lock structure configured to fix the outer cover portion to the container main body in such a state that the opening of the container main body is closed by the outer cover portion. The bending unit may comprise a closing unit configured to press the outer cover portion downward and thereby cause the outer cover portion to be fixed to the container main body by the lock structure.

According to one or more embodiments, the bending unit includes the closing unit serving to cause the outer cover portion to be fixed to the container main body by the lock structure and thereby completely close the opening of the container main body. This readily produces the blister pack with the opening of the container main body closed.

When a very small angle is desired for the relative angle of the outer cover portion, this provides a relatively large amount of heat applied to the hinge portion by the heating portion. It may thus take time to cool down the hinge portion. Continuously holding the outer cover portion by the closing unit until the hinge portion is cooled down extends the holding time and is likely to lower the productivity.

According to one or more embodiments, however, the lock structure keeps the opening of the container main body in the fully closed state, until the hinge portion is cooled down. This provides a very small relative angle of the outer cover portion. There is no need to hold the outer cover portion by the closing unit until the hinge portion is cooled down. This configuration further improves the productivity.

DETAILED DESCRIPTION OF EMBODIMENTS

Figure 1:
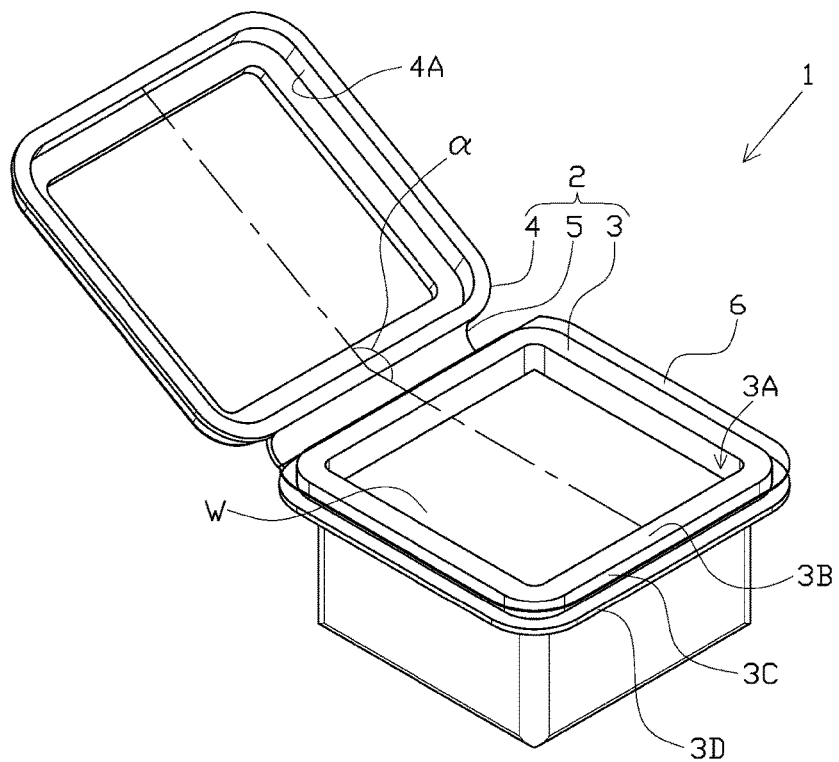
FIG. 1 is a perspective view illustrating a blister pack according to one or more embodiments of the present invention.
Figure 2:
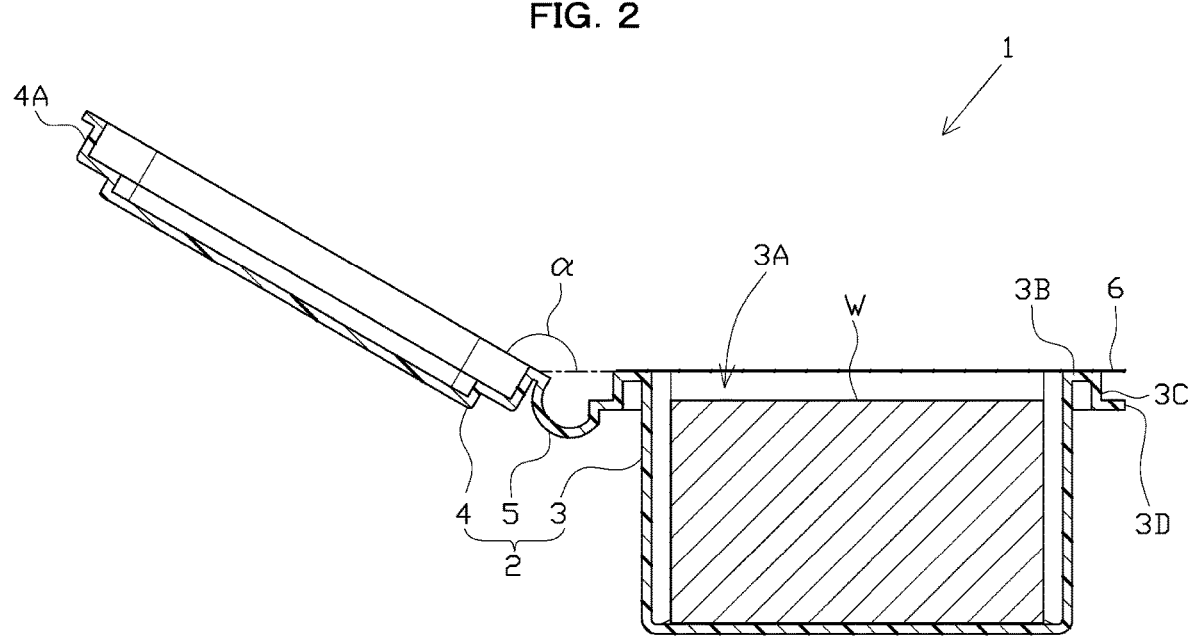
FIG. 2 is a sectional view illustrating the blister pack according to one or more embodiments of the present invention.

The following describes embodiments with reference to drawings. As shown in FIG. 1 and FIG. 2, a blister pack 1 includes a covered container 2 and an inner cover film 6. As a matter of convenience, the covered container 2 and the inner cover film 6 in the respective drawings are illustrated to be thicker than the actual wall thicknesses.

The covered container 2 is made of a thermoplastic resin material, such as PP (polypropylene), PVC (polyvinyl chloride) or PE (polyethylene). The covered container 2 includes a container main body 3, an outer cover portion 4 and a hinge portion 5, which are integrally formed.

The container main body 3 has a storage space 3A which a predetermined article W (for example, a food product or a medical product) is stored in. The outer cover portion 4 is configured to be rotatable relative to the container main body 3 about the hinge portion 5 as a center of rotation. The container main body 3 has an opening that is opened and closed by the outer cover portion 4. The hinge portion 5 is formed in a curved sectional shape and is configured as a part to couple the container main body 3 with the outer cover portion 4.

The container main body 3 includes a ring-shaped sealed portion 3B that is formed to be extended outward from an opening edge of the storage space 3A, and an inner fit portion 3C that is suspended from an outermost circumference of the sealed portion 3B. The outer cover portion 4 includes a ring-shaped outer fit portion 4A having a shape corresponding to the shape of the inner fit portion 3C. In the state that the opening of the container main body 3 is closed by the outer cover portion 4, the outer fit portion 4A is fit on an outer circumference of the inner fit portion 3C, so that the outer cover portion 4 is fixed to the container main body 3. According to one or more embodiments of the present invention, a lock structure (lock) is configured by the inner fit portion 3C and the outer fit portion 4A. According to a modification, the lock structure may be configured by a convex provided on one of the container main body 3 and the outer cover portion 4 and a concave provided on the other of the container main body 3 and the outer cover portion 4 and configured to receive the convex placed therein in the state that the opening of the container main body 3 is closed by the outer cover portion 4.

Additionally, the container main body 3 includes a flange portion 3D extended from a lower end of the inner fit portion 3C toward the outer circumference. In the state that the outer fit portion 4A is fit on the outer circumference of the inner fit portion 3C, the flange portion 3D serves to prevent the inner fit portion 3C from being excessively deformed inward and to more reliably maintain the closed state.

The covered container 2 is creased at the hinge portion 5, such that the outer cover portion 4 is bent relative to the container main body 3. More specifically, a relative angle α of the outer cover portion 4 to the container main body 3 is set to be a predetermined angle smaller than 180 degrees in the state that the closure of the opening of the container main body 3 by the outer cover portion 4 is released (in the state that fitting of the outer fit portion 4A on the outer circumference of the inner fit portion 3C is released).

The inner cover film 6 is made of a thermoplastic resin that is compatible with the covered container 2 and is configured to be transparent or translucent according to one or more embodiments of the present invention. The inner cover film 6 is mounted to the sealed portion 3B, such as to close the opening of the container main body 3.

The following describes the configuration of a blister packaging machine 10 used to manufacture the blister pack 1 described above.

Figure 3:
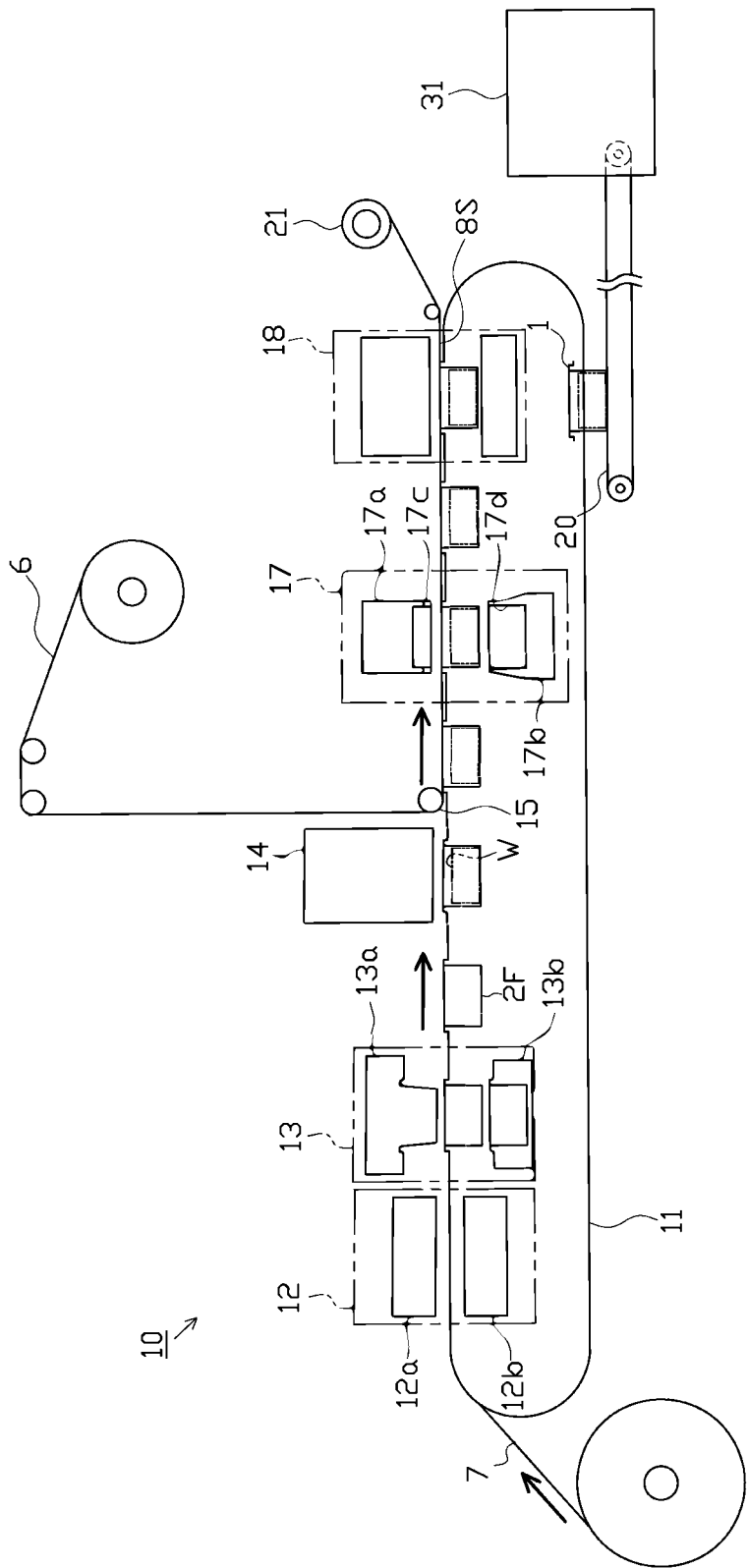
FIG. 3 is a diagram illustrating the schematic configuration of a blister packaging machine according to one or more embodiments of the present invention.

As shown in FIG. 3, in the blister packaging machine 10, a strip-shaped container film 7 drawn out from a film roll is intermittently conveyed to downstream by a predetermined conveyor 11 (for example, chain clipped conveyor). The container film 7 is a material of the covered container 2.

A heating and softening device 12 and a forming device 13 are provided on the downstream side of the film roll of the container film 7. According to one or more embodiments of the present invention, the heating and softening device 12 and the forming device 13 constitute the molding unit.

The heating and softening device 12 includes an upper mold 12a and a lower mold 12b placed vertically across the container film 7 and is configured to partly heat a forming area of the covered container 2 in the container film 7.

Figure 4:
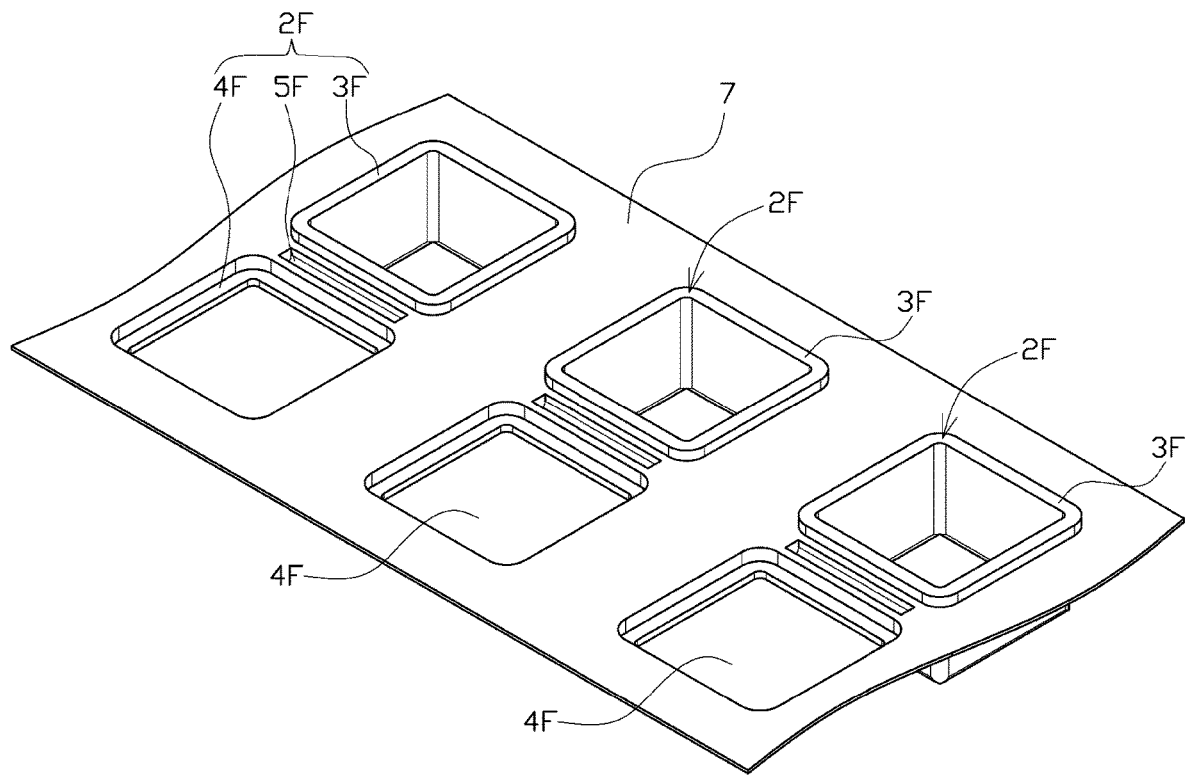
FIG. 4 is a perspective view illustrating a container film with covered container-corresponding parts formed therein according to one or more embodiments of the present invention.

The forming device 13 includes an upper mold 13a that is formed in a shape approximately similar to the shape of the covered container 2 and has a small plug, and a lower mold 13b that has concavity and convexity corresponding to the shape of the covered container 2. After the container film 7 is heated to be relatively soft by the heating and softening device 12, a covered container-corresponding part 2F corresponding to the covered container 2 is formed at a predetermined position of the container film 7 (as shown in FIG. 4) by the upper mold 13a and the lower mold 13b. The covered container-corresponding part 2F includes a container-corresponding part 3F corresponding to the container main body 3, an outer cover-corresponding part 4F corresponding to the outer cover portion 4, and a hinge-corresponding part 5F corresponding to the hinge portion 5. Formation of the covered container-corresponding part 2F is executed during an interval between conveying operations of the container film 7.

A placing device 14 serving as the placing unit is provided on the downstream side of the forming device 13. The placing device 14 serves to place the article W into a space of the container-corresponding part 3F corresponding to the storage space 3A.

Figure 5:
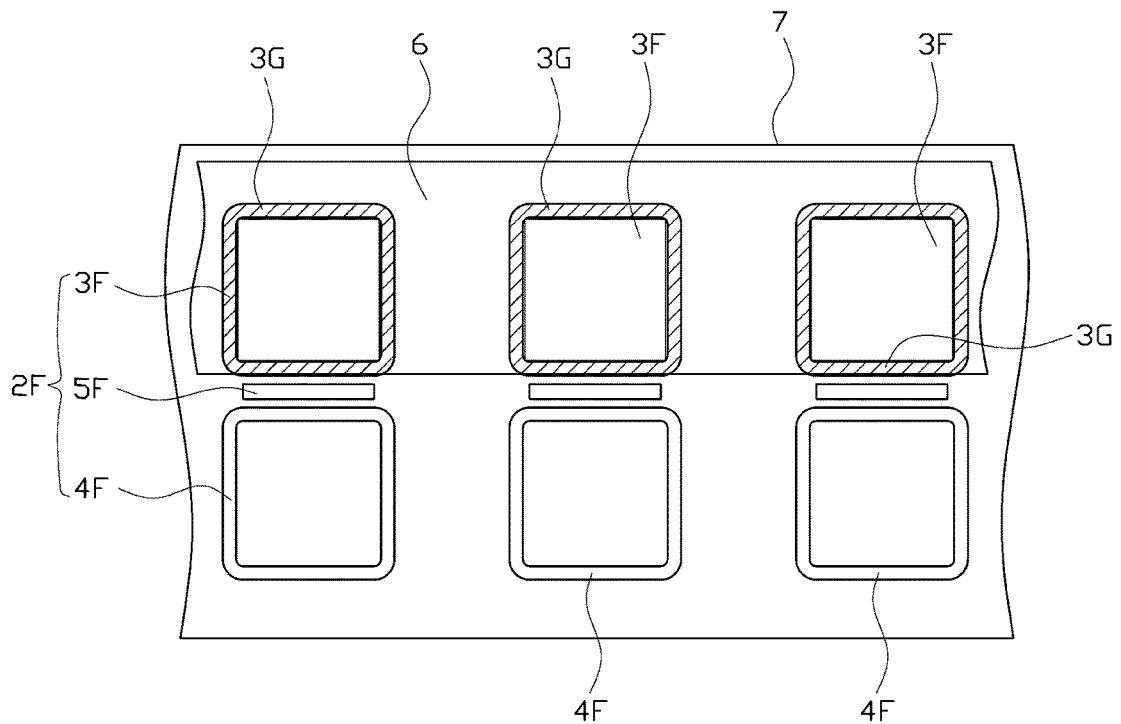
FIG. 5 is a plan view illustrating an inner cover film laid over the container film according to one or more embodiments of the present invention.

A film roll of the inner cover film 6 formed in a strip shape is wound in a roll and is arranged separately from the container film 7. The inner cover film 6 drawn out from the film roll is guided to a receiving roller 15 that is provided on the downstream side of the placing device 14. The inner cover film 6 guided to the receiving roller 15 is extended along the conveying direction of the container film 7 and is laid over the container film 7, such as to close the opening of the container-corresponding part 3F, as shown in FIG. 5.

According to one or more embodiments of the present invention, the width of the inner cover film 6 along a direction perpendicular to the conveying direction of the container film 7 is larger than the width of a sealed portion-corresponding part 3G (hatched area filled with slant lines in FIG. 5) along the direction perpendicular to the conveying direction, which is a portion of the container-corresponding part 3F corresponding to the sealed portion 3B. In the state that the inner cover film 6 is laid over the container film 7, one end in the width direction of the inner cover film 6 is protruded from the sealed portion-corresponding part 3G toward one end in the width direction of the container film 7. The other end in the width direction of the inner cover film 6 is, on the other hand, substantially overlapped with an outer edge of the sealed portion-corresponding part 3G.

Referring back to FIG. 3, a sealing device 17 serving as the sealing unit is provided on the downstream side of the receiving roller 15. The sealing device 17 includes an upper mold 17a and a lower mold 17b.

The upper mold 17a is placed above conveyance paths of the respective films 6 and 7 and is vertically movable by a non-illustrated driving unit. The upper mold 17a includes a heater portion 17c that is formed in a shape corresponding to the sealed portion 3B and is configured to generate heat.

The lower mold 17b includes a recessed portion 17d formed to place therein a downward protruded portion of the covered container-corresponding part 2F and is vertically movable by a non-illustrated driving unit. A flat plane of the lower mold 17b that is extended from an opening of the recessed portion 17d toward the outer circumference serves as a pressing surface configured such that the container film 7 and the inner cover film 6 are placed between this flat plane and the heater portion 17c of the upper mold 17a described above.

In the sealing device 17, the upper mold 17a and the lower mold 17b approach the container film 7 and the inner cover film 6, so that the sealed portion-corresponding part 3G of the container-corresponding part 3F and the inner cover film 6 are placed between the heater portion 17c and the flat plane of the lower mold 17b described above. As a result, the inner cover film 6 is mounted (heat-sealed) to the sealed portion-corresponding part 3G to close the opening of the container-corresponding part 3F.

According to one or more embodiments of the present invention, the sealing device 17 is configured to mount the inner cover film 6 to only the sealed portion-corresponding part 3G of the container-corresponding part 3F. Mounting of the inner cover film 6 is executed during an interval between conveying operations of the container film 7. The inner cover film 6 is sequentially mounted to the container-corresponding parts 3F by the sealing device 17.

A punching device 18 serving as the punching unit is provided on the downstream side of the sealing device 17. The punching device 17 includes a non-illustrated die-cutting punch in a shape corresponding to the outer edge shape of the covered container 2. The covered container-corresponding part 2F of the container film 7 is punched, along with the inner cover film 6, by the die-cutting punch. This produces the blister pack 1 including the covered container 2 having the outer cover portion 4 that is not bent relative to the container main body 3. According to one or more embodiments of the present invention, the shape of the die-cutting punch is set to provide rounded corners in the outer edge of the covered container 2.

The sealing device 17 mounts the inner cover film 6 to only the sealed portion-corresponding part 3G, so that the container film 7 and the inner cover film 6 are not mounted to each other in a scrap portion 8S that is remaining parts of the container film 7 and the inner cover film 6 after punching. The container film 7 and the inner cover film 6 in the scrap portion 8S are respectively made continuous along the conveying direction of the container film 7.

The inner cover film 6 in the scrap portion 8S is wound to be collected by a collecting device 21 provided downstream of the punching device 18. The container film 7 in the scrap portion 8S is, on the other hand, conveyed to a non-illustrated cutting device provided downstream of the punching device 18, is cut into predetermined dimensions by the cutting device, and is accumulated in a non-illustrated predetermined scrap hopper.

A conveyor 20 is provided below the punching device 18. The punched blister pack 1 is conveyed to a closing device 31 serving as the covered container manufacturing device by the conveyor 20.

Figure 6:
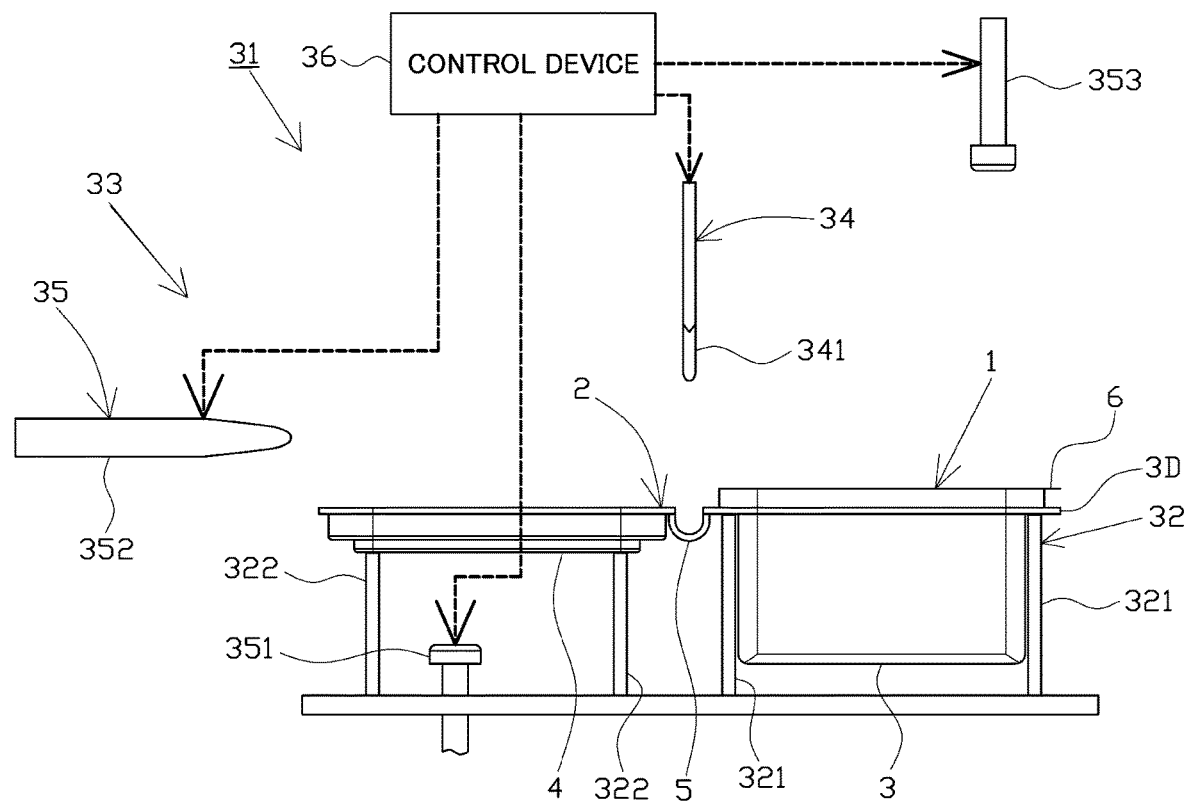
FIG. 6 is a front diagram illustrating the schematic configuration of a closing device according to one or more embodiments of the present invention.

The closing device 31 is configured to produce the covered container 2 with adjusting the relative angle α of the outer cover portion 4 to the container main body 3 and to close the opening of the container main body 3 of the produced covered container 2 by the outer cover portion 4. The closing device 31 includes a support base 32 serving as the support structure, a heating and bending device 33 serving as the angle regulator, and a control device 36, as shown in FIG. 6.

The support base 32 is provided to stationarily support the covered container 2 of the blister pack 1 conveyed by the conveyor 20. The support base 32 includes a pair of container support structures 321 configured to support the flange portion 3D of the container main body 3 upward, and a pair of outer cover support structures 322 configured to support the outer cover portion 4 upward. The flange portion 3D is placed on the two container support structures 321, while the outer cover portion 4 is placed on the two outer cover support structures 322. The covered container 2 is accordingly held in the state that the opening of the container main body 3 faces up and that the outer cover portion 4 is not bent relative to the container main body 3. A lifter (not shown) configured to lift up the blister pack 1 may be used in the process of moving the blister pack 1 from the conveyor 20 to the support base 32.

In the state that the covered container 2 is supported by the support base 32, a downward protruded portion (storage space for the article W) of the container main body 3 is placed between the two container support structures 321, so as to restrict the horizontal move of the covered container 2 along a direction perpendicular to the extending direction of the hinge portion 5. According to one or more embodiments of the present invention, one of the two container support structures 321 that is located farther from the outer cover support structures 322 is configured as the motion restrictor.

The heating and bending device 33 includes a hold heating device 34 and a bending reciprocating device 35.

The hold heating device 34 is configured to heat the hinge portion 5 of the covered container 2 supported by the support base 32 with holding the hinge portion 5 downward. The hold heating device 34 is configured to be vertically movable by a non-illustrated driving unit and to be reciprocable between a retreat position and a contact position. When the hold heating device 34 is placed at the retreat position, the hold heating device 34 is located vertically above the hinge portion 5 to be sufficiently separated from the hinge portion 5. When the hold heating device 34 is placed at the contact position, on the other hand, a lower end thereof is in contact with an upper surface of the hinge portion 5.

A heating portion 341 having a length (width) corresponding to the width of the hinge portion 5 is provided on a lower end of the hold heating device 34 and is configured to generate heat by a non-illustrated heater or the like. The heating portion 341 is configured to change its own temperature by regulating the power supply to the heating portion 341. According to one or more embodiments of the present invention, a lower edge of the heating portion 341 (part that comes into contact with the hinge portion 5) is formed in a rounded shape. According to one or more embodiments of the present invention, the hold heating device 34 is configured as the heating unit (heater) and the hinge holding structure (hinge pressor).

The bending reciprocating device 35 is configured to bend the outer cover portion 4 relative to the container main body 3 about the hinge portion 5 as the center of rotation in the covered container 2 supported by the support base 32. The bending reciprocating device 35 includes a vertically moving bending device 351, a horizontally moving bending device 352, and an outer cover holding device 353. According to one or more embodiments of the present invention, the vertically moving bending device 351, the horizontally moving bending device 352 and the outer cover holding device 353 respectively correspond to the vertically moving bending unit, the horizontally moving bending unit, and the closing unit (outer-cover pressor).

The vertically moving bending device 351 is configured to be linearly movable in a vertical direction by a non-illustrated driving unit and to be reciprocable between a retreat position and a maximum lift position. When the vertically moving bending device 351 is placed at the retreat position, the vertically moving bending device 351 is located vertically below the outer cover position 4 of the covered container 2 supported by the support base 32 to be sufficiently separated from the outer cover portion 4. When the vertically moving bending device 351 is placed at the maximum lift position, on the other hand, an upper end thereof is located above upper ends of the outer cover support structures 322.

The vertically moving bending device 351 moves up from the retreat position and presses the outer cover portion 4 upward in the state that the hinge portion 5 is held downward by the hold heating device 34 (heating portion 341), so as to bend the outer cover portion 4. According to one or more embodiments of the present invention, the vertically moving bending device 351 placed at the maximum lift position lifts up the outer cover portion 4 to have the relative angle α equal to a predetermined first angle (for example, 135 degrees) in the covered container 2 supported by the support base 32. In other words, the vertically moving bending device 351 according to one or more embodiments of the present invention is set to bend the outer cover portion 4 until the relative angle α becomes equal to the first angle. The numerical value given above as the first angle is only an example, and the first angle may be changed appropriately in a range of greater than 90 degrees and less than 180 degrees, according to the lifting amount and the placement position of the vertically moving bending device 351.

The vertically moving bending device 351 is configured to be suspendable at a position between the retreat position and the maximum lift position. Accompanied with suspension of the vertically moving bending device 351, the outer cover portion 4 is kept at the relative angle α that is any angle of not less than the first angle and of less than 180 degrees.

The horizontally moving bending device 352 is configured to be linearly movable along a horizontal direction by a non-illustrated driving unit and to be reciprocable between a backward position and a forward position at a location slightly above an upper end face (sealed portion 3B according to one or more embodiments of the present invention) of the container main body 3 of the covered container 2 supported by the support base 32. When the horizontally moving bending device 352 is placed at the backward position, the horizontally moving bending device 352 is located to be sufficiently separated from the covered container 2 and does not interfere with bending of the outer cover portion 4 by the vertically moving bending device 351. When the horizontally moving bending device 352 is placed at the forward position, on the other hand, the horizontally moving bending device 352 is located vertically above the container main body 3.

The horizontally moving bending device 352 moves in the horizontal direction from the backward position toward the container main body 3 and presses the outer cover portion 4 bent by the vertically moving bending device 351, so as to bend the outer cover portion 4 toward the opening of the container main body 3. According to one or more embodiments of the present invention, when the horizontally moving bending device 352 is placed at the forward position, the horizontally moving bending device 352 bends the outer cover portion 4 to have the relative angle α equal to a predetermined second angle (for example, 5 degrees). In other words, the horizontally moving bending device 352 according to one or more embodiments of the present invention is set to bend the outer cover portion 4 until the relative angle α becomes equal to the second angle. The numerical value given above as the second angle is only an example, and the second angle may be set to a predetermined angle of greater than 0 degree by adjusting the relative position of the horizontally moving bending device 352 placed at the forward position relative to the covered container 2.

Like the vertically moving bending device 351, the horizontally moving bending device 352 is configured to be suspendable and to hold the outer cover portion 4 in the bent state by the suspension. According to one or more embodiments of the present invention, accompanied with suspension of the horizontally moving bending device 352, the outer cover portion 4 is kept at the relative angle α that is any angle of not less than the second angle and of less than the first angle.

Figure 10:
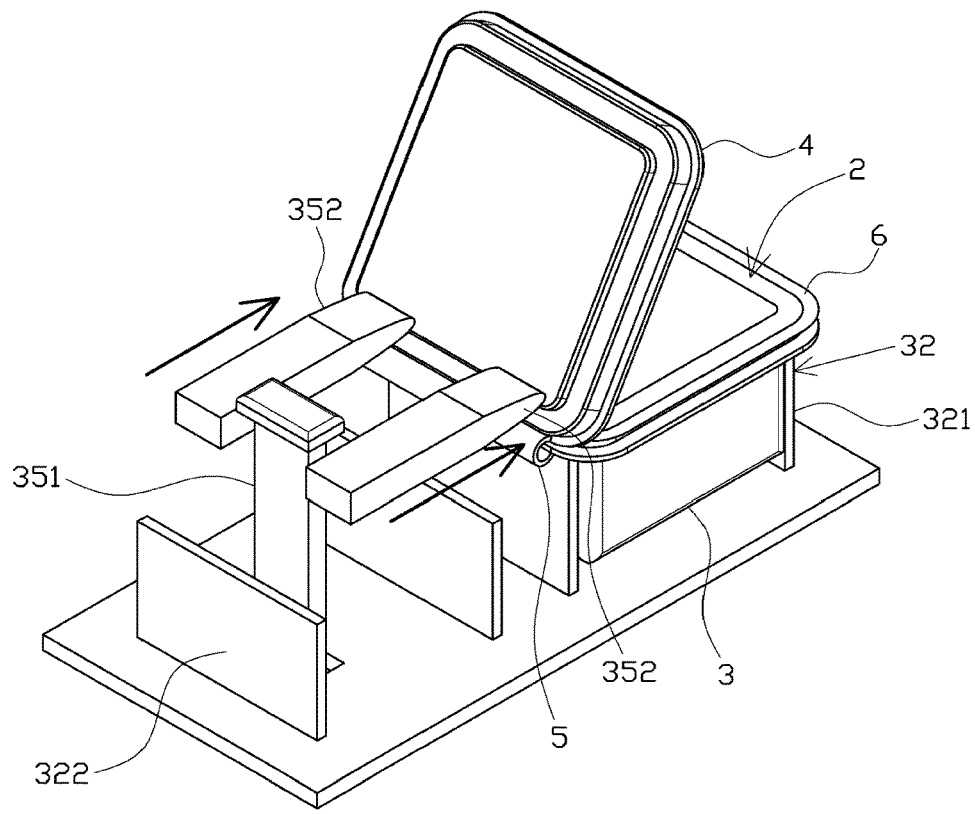
FIG. 10 is a perspective diagram illustrating the closing device with the outer cover portion bent by a horizontally moving bending device according to one or more embodiments of the present invention.

According to one or more embodiments of the present invention, the vertically moving bending device 351 and the horizontally moving bending device 352 are arranged to be shifted in position along a direction perpendicular to these moving directions (sheet depth direction of FIG. 6) (as shown in FIG. 10). This arrangement prevents these devices 351 and 352 from interfering with each other during moving.

The outer cover holding device 353 is located vertically above the container main body 3 of the covered container 2 supported by the support base 32 and is configured to be reciprocable along the vertical direction between a retreat position and a maximum lowering position by a non-illustrated driving unit. When the outer cover holding device 353 is placed at the retreat position, the outer cover holding device 353 is located to be sufficiently separated from the container main body 3 and does not interfere with bending of the outer cover portion 4 by the horizontally moving bending device 352. When the outer cover holding device 353 is placed at the maximum lowering position, on the other hand, a lower end thereof is located immediately above the container main body 3 in the vertical direction.

The outer cover holding device 353 is lowered from the retreat position to press downward the outer cover portion 4 bent by the horizontally moving bending device 352. When the outer cover holding device 353 is placed at the maximum lowering position, the outer fit portion 4A is fit on the outer circumference of the inner fit portion 3, so that the outer cover portion 4 is fixed to the container main body 3. This accordingly produces the blister pack 1 with the opening of the container main body 3 closed by the outer cover portion 4. The produced blister pack 1 is unloaded from the support base 32 by a non-illustrated unloading unit and is transferred to a non-illustrated finished product hopper.

According to one or more embodiments of the present invention, the horizontally moving bending device 352 and the outer cover holding device 353 are arranged to be shifted in position along the direction perpendicular to these moving directions (sheet depth direction of FIG. 6) (as shown in FIG. 10). This arrangement prevents these devices 352 and 353 from interfering with each other during moving.

According to one or more embodiments of the present invention, the hold heating device 34 (more specifically a portion corresponding to the hinge holding structure or hinge pressor) and the bending reciprocating device 35 are configured as the bending unit.

The control device 36 includes a CPU as an arithmetic unit, a ROM configured to store various programs therein, a RAM configured to temporarily store various data including operation data and input/output data, and a hard disk configured to store the operation data and the like for a long time period. The control device 36 is configured to control the operations of the hold heating device 34, the vertically moving bending device 351, the horizontally moving bending device 352 and the outer cover holding device 353.

Information regarding, for example, the material, the thickness and the dimensions of the covered container 2 is stored in advance in the control device 36. Tables specifying relationships of information regarding the relative angle α to various control data, for example, the moving timing of the hold heating device 34 and the moving amount and the moving timing of the bending reciprocating device 35 are stored in advance in the control device 36. The holding time (heating time) of the hinge portion 5 by the heating portion 341 is changed with a variation in the moving timing of the hold heating device 34. Suspending positions and suspending times of the vertically moving bending device 351 and the horizontally moving bending device 352 are changed with variations in the moving amount and the moving timing of the bending reciprocating device 35.

The control device 36 regulates the electric power to be supplied to the heating portion 341 according to the stored information regarding, for example, the material and the thickness of the covered container 2 and sets the temperature of the heating portion 341 to an appropriate temperature. The control device 36 may be configured, such that the temperature of the heating portion 341 is determined corresponding to temperature information input via a non-illustrated input unit.

Furthermore, the control device 36 receives a target value of the relative angle α (or information relating to the relative angle α) input via a non-illustrated input unit and obtains various control data with regard to, for example, the moving timings of the hold heating device 34 and the bending reciprocating device 35, based on the tables described above. The control device 36 then controls the operations of the hold heating device 34 and the bending reciprocating device 35, based on the obtained control data.

According to one or more embodiments of the present invention, in the case of a relatively large target value of the relative angle α (for example, in a range of not less than the first angle described above and of less than 180 degrees), the control device 36 may obtain, for example, control data as described below.

More specifically, the control device 36 obtains such data as to provide a relatively short holding time (heating time) of the hinge portion 5 by the hold heating device 34 (heating portion 341), as control data with regard to the moving timing of the hold heating device 34. The control device 36 also obtains such data as to cause the vertically moving bending device 351 to move up from the retreat position at a timing corresponding to the holding time (heating time) of the hinge portion 5, to be suspended for a predetermined time period at a suspending position corresponding to the input target value of the relative angle α, to subsequently move to the maximum lift position, and to go back to the retreat position, as control data with regard to the moving amount and the moving timing of the vertically moving bending device 351. The control device 36 further obtains such data as to cause the horizontally moving bending device 352 to move from the backward position at a timing corresponding to the reach of the vertically moving bending device 351 to the maximum lift position, to subsequently move to the forward position, and to go back to the backward position, as control data with regard to the moving amount and the moving timing of the horizontally moving bending device 352. Additionally, the control device 36 obtains such data as to cause the outer cover holding device 353 to move from the retreat position at a timing corresponding to the reach of the horizontally moving bending device 352 to the forward position, to subsequently move to the maximum lowering position, and to go back to the retreat position, as control data with regard to the moving amount and the moving timing of the outer cover holding device 353.

According to one or more embodiments of the present invention, in the case of a relatively small target value of the relative angle α (for example, in a range of not less than the second angle described above and of less than the first angle described above), the control device 36 may obtain, for example, control data as described below.

More specifically, the control device 36 obtains such data as to provide a relatively long holding time (heating time) of the hinge portion 5 by the hold heating device 34 (heating portion 341), as the control data with regard to the moving timing of the hold heating device 34. The control device 36 also obtains such data as to cause the vertically moving bending device 351 to move up from the retreat position at a timing corresponding to the holding time (heating time) of the hinge portion 5, to subsequently move to the maximum lift position, and to go back to the retreat position, as the control data with regard to the moving amount and the moving timing of the vertically moving bending device 351. The control device 36 further obtains such data as to cause the horizontally moving bending device 352 to move from the backward position at a timing corresponding to the reach of the vertically moving bending device 351 to the maximum lift position, to be suspended for a predetermined time period at a suspending position corresponding to the input target value of the relative angle α, to subsequently move to the forward position, and to go back to the backward position, as the control data with regard to the moving amount and the moving timing of the horizontally moving bending device 352. The control device 36 obtains data similar to the data described above (in the case of the relatively large target value of the relative angle α), as the control data with regard to the moving amount and the moving timing of the outer cover holding device 353.

Furthermore, in the case of a very small target value of the relative angle α (for example, a value near to 0 degree), the control device 36 obtains such data as to provide the longest possible set holding time (heating time) of the hinge portion 5 by the hold heating device 34 (heating portion 341), as the control data with regard to the moving timing of the hold heating device 34. The control device 36 obtains such data as to cause the vertically moving bending device 351 and the horizontally moving bending device 352 to move without suspension, as the control data with regard to the moving amounts and the moving timings of the vertically moving bending device 351 and the horizontally moving bending device 352. The control device 36 obtains data similar to the data described above, as the control data with regard to the moving amount and the moving timing of the outer cover holding device 353.

One or more embodiments of the present invention are configured such that the hinge portion 5 is held by the hold heating device 34 (heating portion 341) at least on start of bending of the outer cover portion 4 by the vertically moving bending device 351.

The following describes the operations of the closing device 31 more in detail. Prior to these operations, the control device 36 obtains in advance the control data based on the input target value of the relative angle α. The hold heating device 34, the vertically moving bending device 351 and the outer cover holding device 353 are respectively placed at the respective retreat positions, and the horizontally moving bending device 352 is placed at the backward position.

The following first describes the operations when a relatively large value (for example, in the range of not less than the first angle described above and of less than 180 degrees) is input as the target value of the relative angle α.

Figure 7:
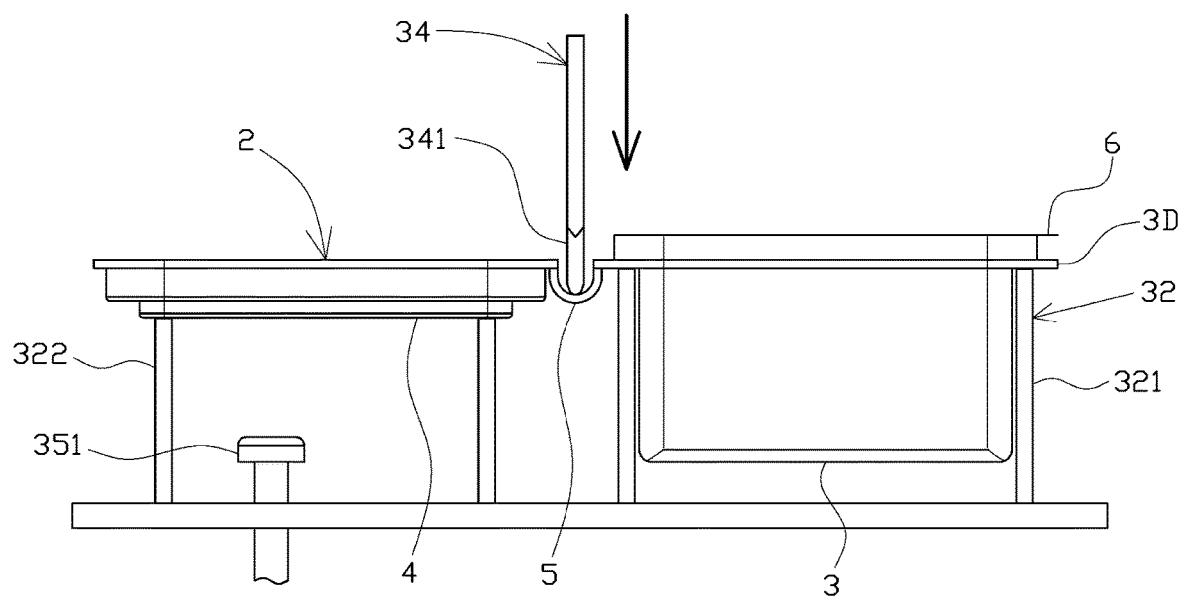
FIG. 7 is a front diagram illustrating the closing device with a hinge portion held by a heating portion according to one or more embodiments of the present invention.

As shown in FIG. 7, when the covered container 2 of the blister pack 1 conveyed by the conveyor 20 is supported by the support base 32 (for example, in response to detection of the support of the covered container 2 by a predetermined sensor), the hold heating device 34 starts moving down, moves to the contact position and then stops. The temperature of the heating portion 341 is set to an appropriate value according to the material, the thickness and the like of the covered container 2, before or while the hold heating device 34 moves down.

When the hold heating device 34 moves to the contact position, the heating portion 341 comes into contact with a corresponding bending inner part of the hinge portion 5 to hold and heat the hinge portion 5.

Figure 8:
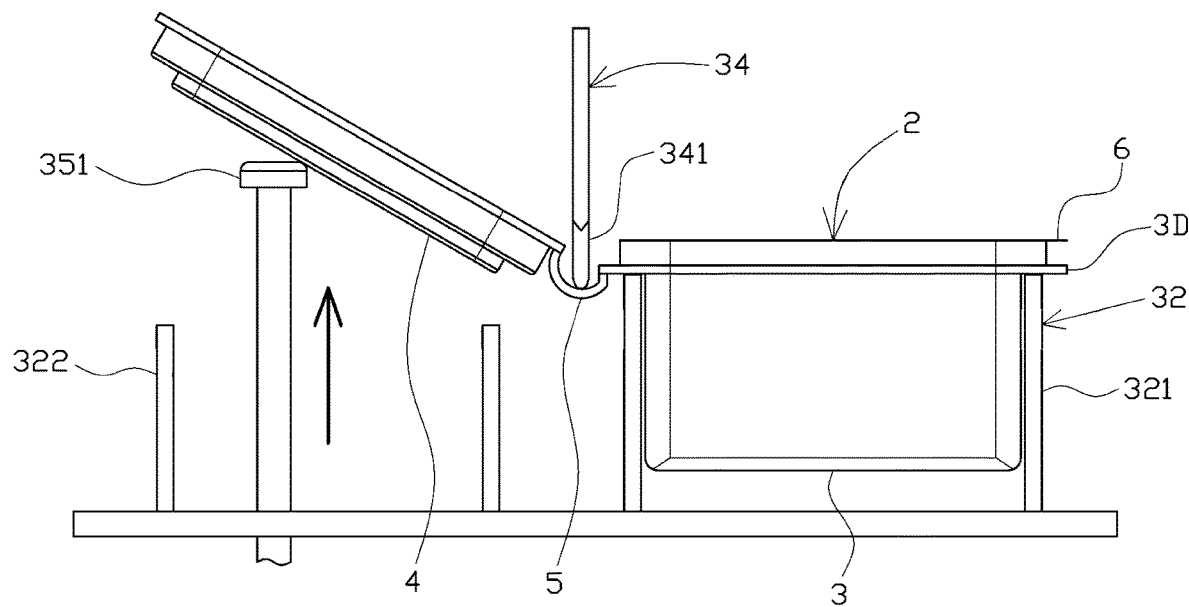
FIG. 8 is a front diagram illustrating the closing device with the hinge portion held by the heating portion and an outer cover portion bent by a vertically moving bending device according to one or more embodiments of the present invention.

As shown in FIG. 8, the vertically moving bending device 351 subsequently starts moving up at a moving timing based on the control data (which varies with a variation in holding time of the hinge portion 5 by the heating portion 341) and presses the outer cover portion 4 upward. The outer cover portion 4 is thus gradually bent relative to the container main body 3 at the hinge portion 5 that is held and heated by the heating portion 341.

Figure 9:
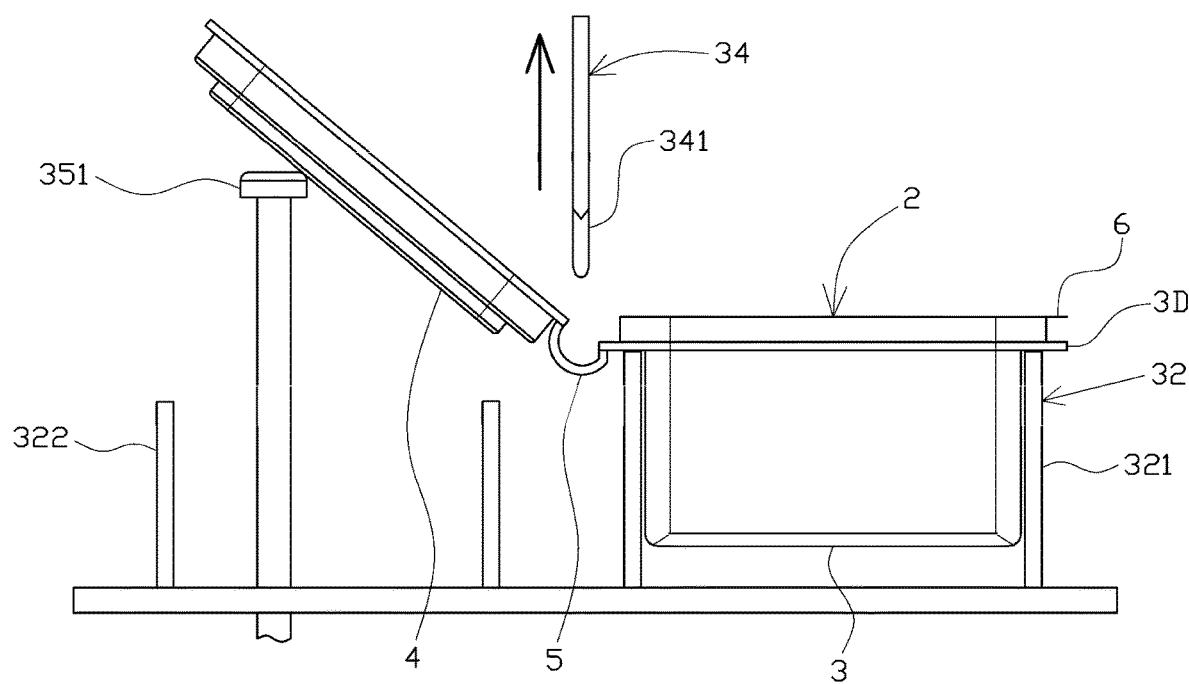
FIG. 9 is a front diagram illustrating the closing device with the outer cover portion kept in a bent state by suspension of the vertically moving bending device according to one or more embodiments of the present invention.

As shown in FIG. 9, the vertically moving bending device 351 reaches a suspending position corresponding to the target value of the relative angle α and is suspended at the suspending position for a predetermined time period. The hold heating device 34 goes back to the retreat position at a timing based on the control data or more specifically at the time when a required heat amount is applied to the hinge portion 5, while the vertically moving bending device 351 is suspended or moves up. The outer cover portion 4 is kept in the bent state at a bending angle corresponding to the target value of the relative angle α, until the hinge portion 5 is cooled down to some extent by the suspension of the vertically moving bending device 351. As a result, the hinge portion 5 is "creased" corresponding to the target value of the relative angle α. The amount of heat applied to the hinge portion 5 is changed with a variation in holding time of the hinge portion 5 by the heating portion 341. A relatively large target value of the relative angle α provides a relatively short holding time and thereby applies a relatively small amount of heat to the hinge portion 5.

After elapse of the suspending time, the vertically moving bending device 351 resumes moving up and reaches the maximum lift position.

Figure 11:
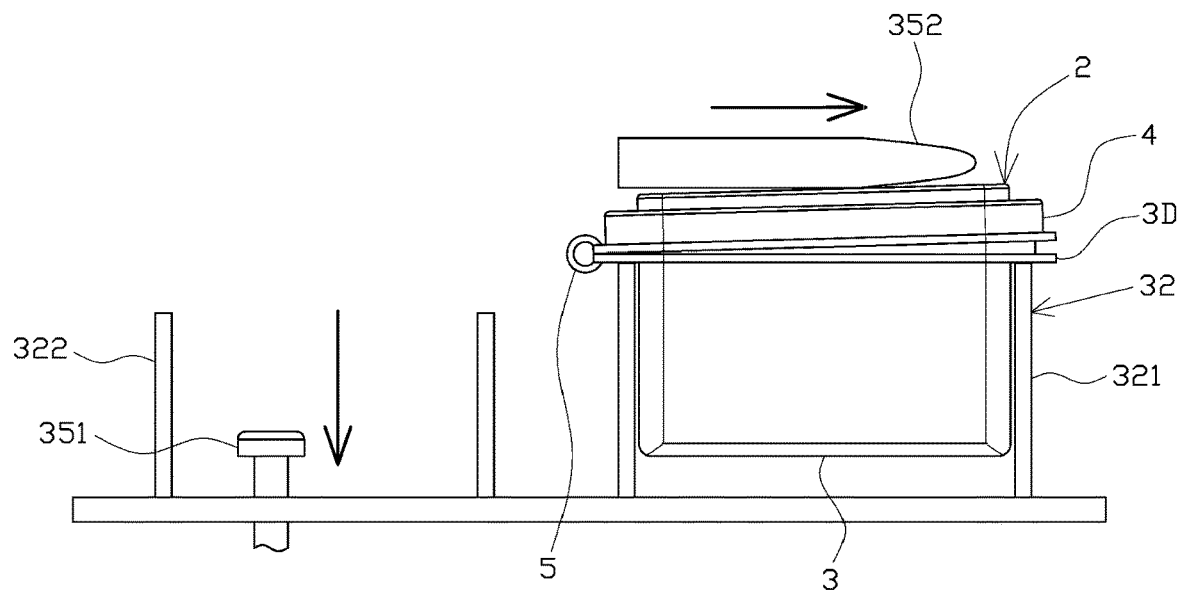
FIG. 11 is a front diagram illustrating the closing device with the outer cover portion bent by the horizontally moving bending device according to one or more embodiments of the present invention.

As shown in FIG. 10, the horizontally moving bending device 352 subsequently starts moving from the backward position at a timing corresponding to the reach of the vertically moving bending device 351 to the maximum lift position and moves to the forward position. This causes the outer cover portion 4 to be placed immediately above the opening of the container main body 3 as shown in FIG. 11. The vertically moving bending device 351 goes back to the retreat position, before, during or after the move of the horizontally moving bending device 352.

Figure 12:
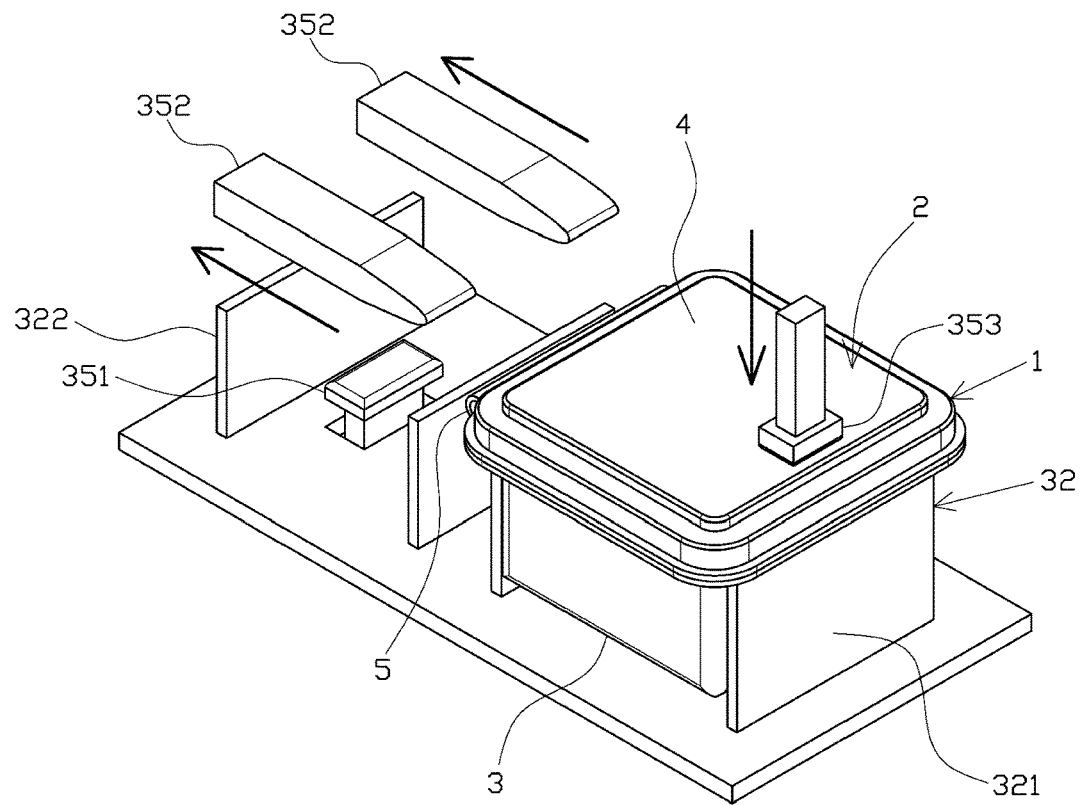
FIG. 12 is a perspective view illustrating the closing device with the outer cover portion held by an outer cover holding device according to one or more embodiments of the present invention.

As shown in FIG. 12, the outer cover holding device 353 starts moving down from the retreat position at a timing corresponding to the reach of the horizontally moving bending device 352 to the forward position and moves to the maximum lowering position. The horizontally moving bending device 352 goes back to the backward position, while or after the outer cover holding device 353 moves down.

When the outer cover holding device 353 is placed at the maximum lowering position, the outer fit portion 4A is fit on the outer circumference of the inner fit portion 3C, so that the outer cover portion 4 is fixed to the container main body 3. This accordingly produces the blister pack 1 (covered container 2) with the opening of the container main body 3 closed by the outer cover portion 4. The outer cover holding device 353 goes back to the retreat position after the opening of the container main body 3 is closed by the outer cover portion 4.

The following describes the operations of the closing device 31 when a relatively small value (for example, in the range of not less than the second angle described above and of less than the first angle described above) is input as the target value of the relative angle α.

When the covered container 2 of the blister pack 1 conveyed by the conveyor 20 is supported by the support base 32, the hold heating device 34 starts moving down, moves to the contact position and then stops (as shown in FIG. 7). The temperature of the heating portion 341 is set to a temperature based on the control data, before or while the hold heating device 34 moves down.

When the hold heating device 34 moves to the contact position, the heating portion 341 comes into contact with the corresponding bending inner part of the hinge portion 5 to hold and heat the hinge portion 5. The holding time of the hinge portion 5 in the case of the relatively small target value of the relative angle α is set longer than the holding time of the hinge portion 5 in the case of the relatively large target value of the relative angle α, thereby causing a relatively large amount of heat to be applied to the hinge portion 5.

Figure 13:
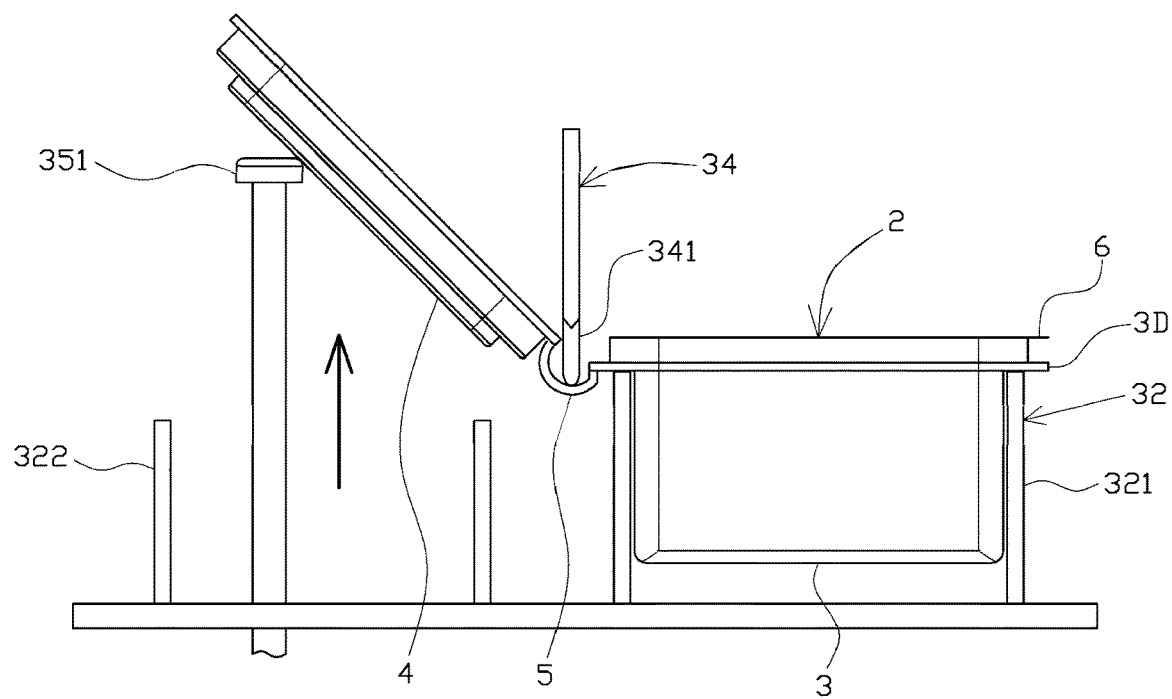
FIG. 13 is a front diagram illustrating the closing device with the hinge portion held by the heating portion and the outer cover portion bent by the vertically moving bending device according to one or more embodiments of the present invention.

As shown in FIG. 13, the vertically moving bending device 351 subsequently starts moving up at a moving timing based on the control data (which varies with a variation in heating time of the hinge portion 5 by the heating portion 341) and moves to the maximum lift position without suspension, with pressing the outer cover portion 4 upward. The outer cover portion 4 is thus bent relative to the container main body 3 at the hinge portion 5 that is held and heated by the heating portion 341. The hold heating device 34 goes back to the retreat position at a timing based on the control data or more specifically at the time when a required heat amount is applied to the hinge portion 5, after or while the vertically moving bending device 351 moves up.

Figure 14:
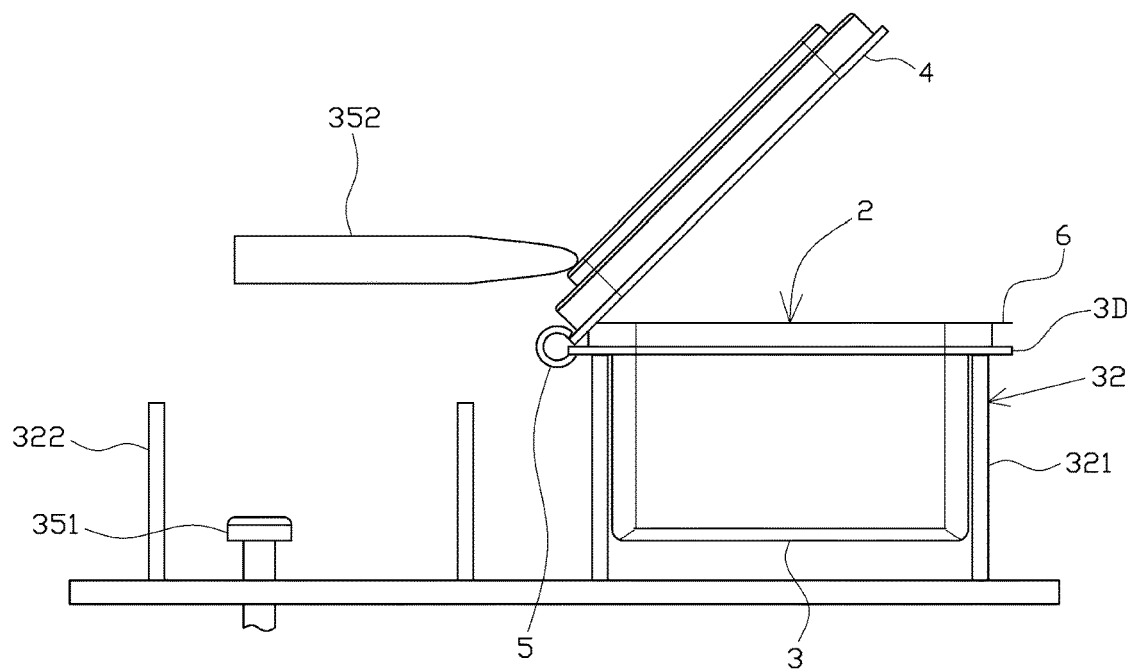
FIG. 14 is a front diagram illustrating the closing device with the outer cover portion kept in the bent state by suspension of the horizontally moving bending device according to one or more embodiments of the present invention.

The horizontally moving bending device 352 subsequently starts moving from the backward position at a timing corresponding to the reach of the vertically moving bending device 351 to the maximum lift position (as shown in FIG. 10). As shown in FIG. 14, the horizontally moving bending device 352 reaches a suspending position corresponding to the target value of the relative angle α and is suspended at the suspending position. The outer cover portion 4 is kept in the bent state at a bending angle corresponding to the target value of the relative angle α, until the hinge portion 5 is cooled down to some extent. As a result, the hinge portion 5 is "creased" corresponding to the target value of the relative angle α.

After elapse of the suspending time, the horizontally moving bending device 352 resumes moving and moves to the forward position. This causes the outer cover portion 4 to be placed immediately above the opening of the container main body 3 (as shown in FIG. 11).

Subsequently, the outer cover holding device 353 and the horizontally moving bending device 352 execute similar operations to the operations described above when a relatively large value is input as the target value of the relative angle α and accordingly produces the blister pack 1 with the opening of the container main body 3 closed by the outer cover portion 4.

The following describes the operations of the closing device 31 when a very small value (for example, a value near to zero degree) is input as the target value of the relative angle α.

When the covered container 2 of the blister pack 1 conveyed by the conveyor 20 is supported by the support base 32, the hold heating device 34 moves from the retreat position to the contact position and causes the hinge portion 5 to be held and heated by the heating portion 341 (as shown in FIG. 7). The holding time of the hinge portion 5 in this case is the longest possible set time.

The vertically moving bending device 351 subsequently starts moving up at a moving timing based on the control data (which varies with a variation in heating time of the hinge portion 5 by the heating portion 341) and moves to the maximum lift position without suspension, with pressing the outer cover portion 4 upward (as shown in FIG. 13). The outer cover portion 4 is thus bent relative to the container main body 3 at the hinge portion 5 that is held and heated by the heating portion 341. The hold heating device 34 goes back to the retreat position at a timing based on the control data or more specifically at the time when a required heat amount is applied to the hinge portion 5, after or while the vertically moving bending device 351 moves up.

The horizontally moving bending device 352 subsequently starts moving from the backward position at a timing corresponding to the reach of the vertically moving bending device 351 to the maximum lift position and moves to the forward position without suspension (as shown in FIGS. 10 and 11). This causes the outer cover portion 4 to be placed immediately above the opening of the container main body 3.

The outer cover holding device 353 starts moving down from the retreat position at a timing corresponding to the reach of the horizontally moving bending device 352 to the forward position and moves to the maximum lowering position. The horizontally moving bending device 352 goes back to the backward position, while or after the outer cover holding device 353 moves down.

Subsequently, the outer cover holding device 353 and the horizontally moving bending device 352 execute similar operations to the operations described above when a relatively large value is input as the target value of the relative angle α and accordingly produces the blister pack 1 with the opening of the container main body 3 closed by the outer cover portion 4. Fitting the outer fit portion 4A on the outer circumference of the inner fit portion 3C causes the outer cover portion 4 to be kept in the bent state at the bending angle corresponding to the target value of the relative angle α, until the hinge portion 5 is cooled down. As a result, the hinge portion 5 is "creased" corresponding to the target value of the relative angle α.

As described above in detail, according to one or more embodiments of the present invention, the covered container 2 with the relative angle α set to a predetermined angle of less than 180 degrees is produced by regulating the heating degree of the hinge portion 5 by the heating portion 341 and the bending angle of the outer cover portion 4 by the bending reciprocating device 35. This configuration enhances the convenience in the use of the covered container 2.

The outer cover portion 4 is bent, while the covered container 2 is supported by the support base 32. This configuration enables the outer cover portion 4 to be bent in the more stable state. This accordingly causes the relative angle α to be set to a desired angle with high accuracy and more effectively prevents a variation in relative angle α from occurring among the respective covered containers 2 after bending.

Furthermore, the outer cover portion 4 is bent, while the hinge portion 5 is held by the hold heating device 34 (heating portion 341). This configuration enables the outer cover portion 4 to be more reliably bent about the hinge portion 5 as the center of rotation. This more reliably causes the hinge portion 5 to be clearly "creased". As a result, the relative angle α is set to a desired angle with high accuracy. This also more effectively prevents a variation in relative angle α from occurring among the respective covered containers 2 after bending.

Additionally, the hinge portion 4 is held downward by the hold heating device 34 (heating portion 341). This configuration suppresses the covered container 2 from being lifted up by the vertically moving bending device 351 and enables the outer cover portion 4 to be more reliably bent about the hinge portion 5 as the center of rotation.

The vertically moving bending device 351 and the horizontally moving bending device 352 are respectively configured to be linearly moved. This simplifies the mechanisms of these two devices 351 and 352 and reduces the manufacturing cost. Moreover, this simplifies the operations of the vertically moving bending device 351 and the horizontally moving bending device 352 and enhances the operation stabilities of these two devices 351 and 352, thus improving the productivity.

The container support structures 321 provided on the support base 32 serve to restrict the motion of the covered container 2 along the pressing direction in the process of pressing and bending the outer cover portion 4 by the horizontally moving bending device 352. This configuration accordingly enables the outer cover portion 4 to be bent more precisely.

Additionally, the vertically moving bending device 351 and the horizontally moving bending device 352 are configured to be suspendable and thereby enable the outer cover portion 4 to be kept in the bent state relative to the container main body 3. This causes the outer cover portion 4 to be kept in the bent state corresponding to the target value of the relative angle α, until the hinge portion 5 is cooled down, and thereby more reliably causes the hinge portion 5 to be clearly "creased". This causes the relative angle α to be set to a desired angle with the higher accuracy. This also more effectively prevents a variation in relative angle α from occurring among the respective covered containers 2 after bending.

Moreover, according to one or more embodiments of the present invention, fitting the outer fit portion 4A on the outer circumference of the inner fit portion 3C by the outer cover holding device 353 fixes the outer cover portion 4 to the container main body 3 and completely closes the opening of the container main body 3. This configuration thus readily produces the blister pack 1 with the opening of the container 3 closed.

When the relative angle α is desired to be very small (for example, when the relative angle α is desired to be a value near to 0 degree), the opening of the container main body 3 is kept in the fully closed state by the inner fit portion 3C and the outer fit portion 4A, until the hinge portion 5 is cooled down. This causes the relative angle α to be very small. There is no need to keep the outer cover portion 4 by the outer cover holding device 353 until the hinge portion 5 is cooled down. This configuration further improves the productivity.

Additionally, according to one or more embodiments of the present invention, the covered container 2 is produced by punching. This enhances the flexibility of design with regard to the outer edge shape of the blister pack 1 (or more specifically, the covered container 2). In the process of producing the blister pack 1, the outer edge shape of the blister pack 1 is formed to a desired shape by only punching. This eliminates a need to separately execute a process of rounding the corners and the like and thereby further improves the productivity.

The present invention is not limited to the description of the above embodiments but may be implemented, for example, by configurations described below. The present invention may also be naturally implemented by applications and modifications other than those illustrated below.

Figure 15:
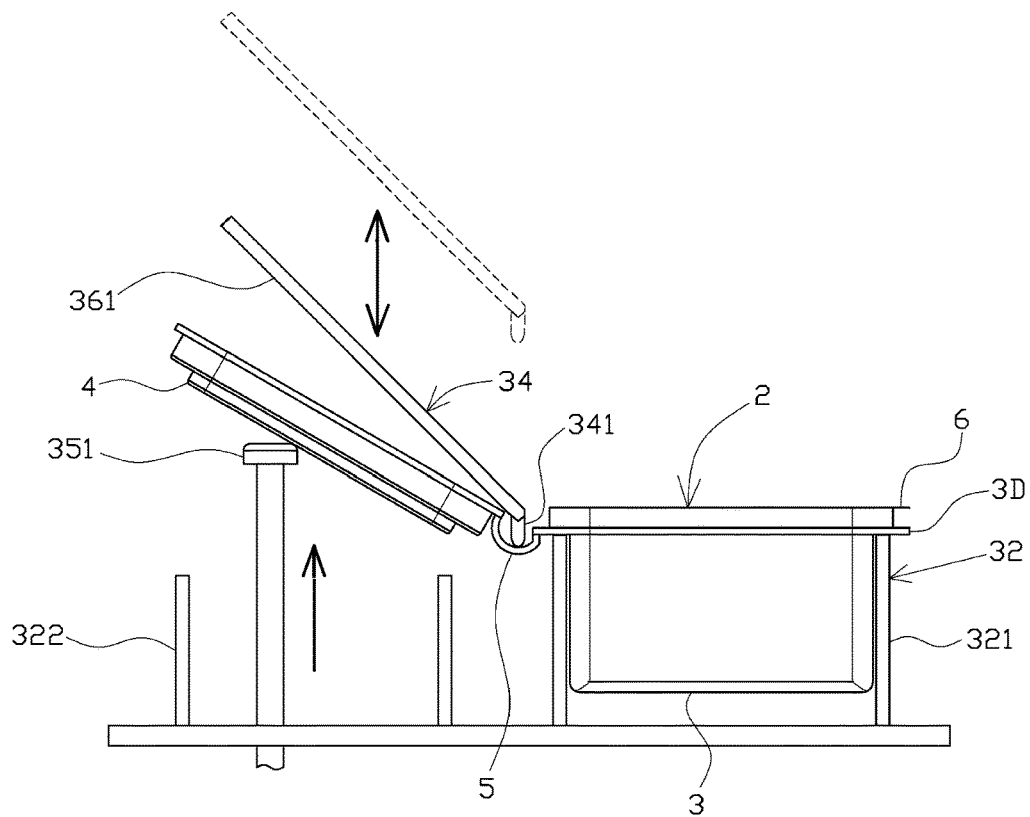
FIG. 15 is a front diagram of a closing device to show a support plate according to one or more embodiments of the present invention.

(a) As shown in FIG. 15, a support plate 361 may be provided as the receiving structure (receiving plate) to receive the outer cover portion 4 at a position where the outer cover portion 4 is placed between the support plate 361 and the vertically moving bending device 351, when the outer cover portion 4 is kept in the bent state relative to the container main body 3 by the vertically moving bending device 351.

Figure 16:
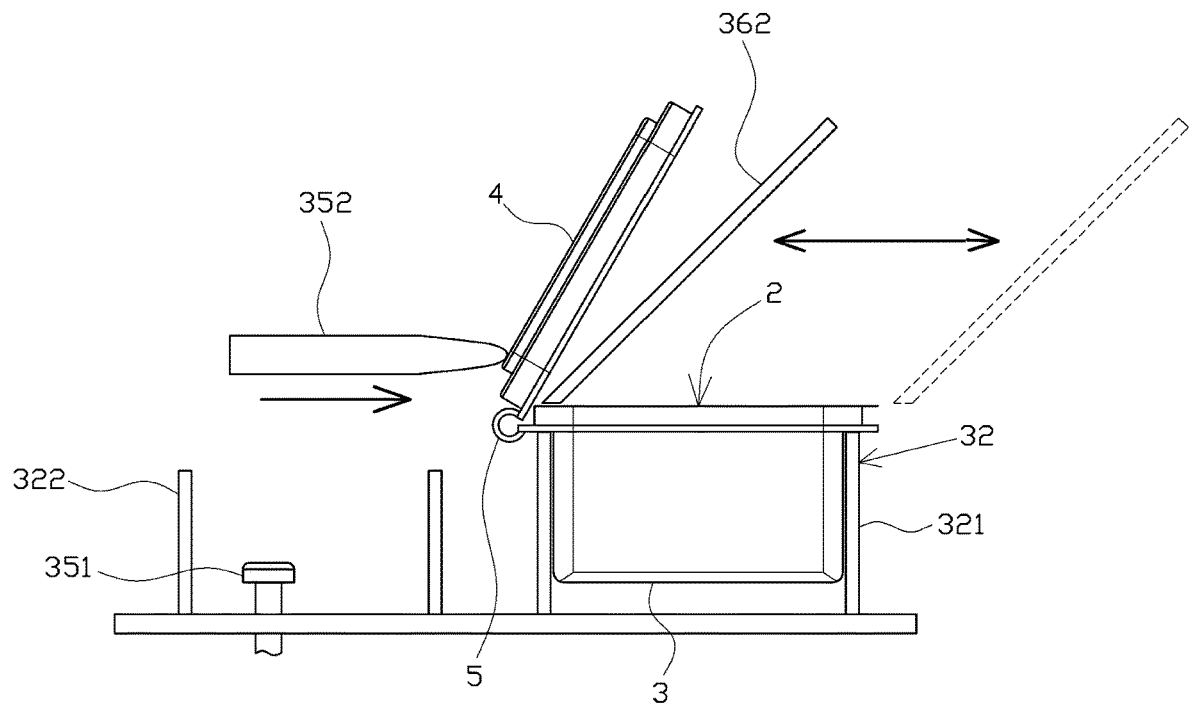
FIG. 16 is a front diagram of a closing device to show a support plate according to one or more embodiments of the present invention.

As shown in FIG. 16, a support plate 362 may be provided as the receiving structure to receive the outer cover portion 4 at a position where the outer cover portion 4 is placed between the support plate 362 and the horizontally moving bending device 352, when the outer cover portion 4 is kept in the bent state relative to the container main body 3 by the horizontally moving bending device 352. The support plate 361 or 362 is configured to be retreated to a position where the support plate 361 or 362 does not interfere with bending of the outer cover portion 4.

The configuration of providing the support plate 361 or 362 more effectively prevents the outer cover portion 4 from being kept in an excessively bent state. This accordingly causes the relative angle α to be set to a desired angle with the higher accuracy. This also more effectively makes the relative angle α uniform among the respective covered containers 2 after bending.

As shown in FIG. 15, integrating the support plate 361 with the hold heating device 34 (i.e., integrating the support structure with the hinge holding structure or hinge pressor) further simplifies the mechanism and further reduces the manufacturing cost.

Figure 17:
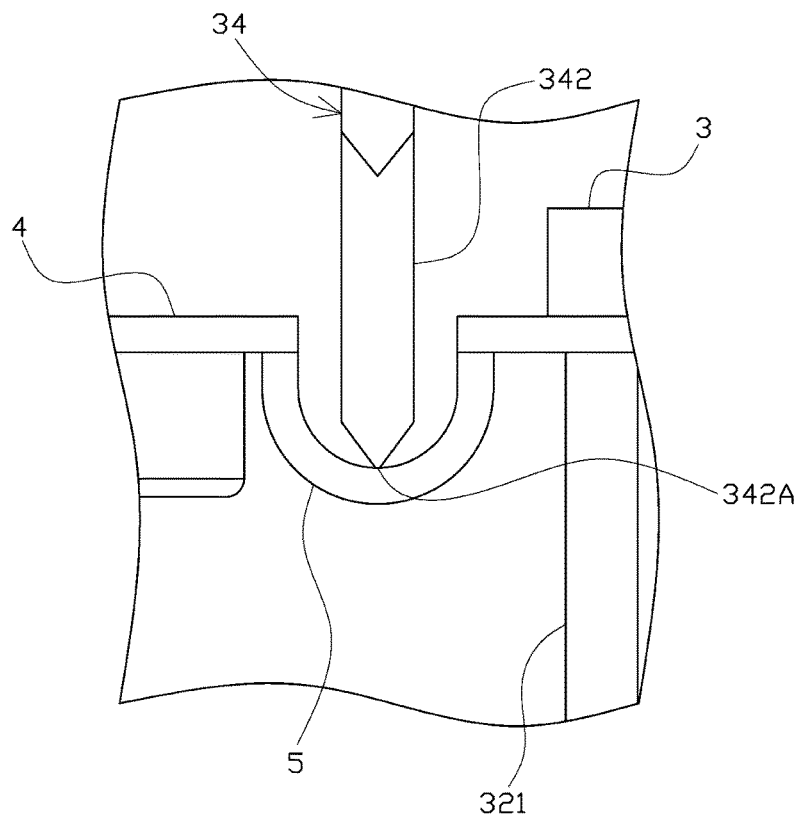
FIG. 17 is an enlarged diagram of a hinge portion and its periphery to show a heating portion according to one or more embodiments of the present invention.

(b) According to the above embodiments, the lower end of the heating portion 341 (part that is in contact with the hinge portion 5) is formed in the rounded shape. The shape of the heating portion may be, however, appropriately changed or modified. For example, as shown in FIG. 17, a projection 342A of a pointed end protruded toward the hinge portion 5-side may be provided on a lower end of the heating portion 342. This modified configuration enables especially an area of the hinge portion 5 coming into contact with the projection 324A to be recessed and bent and thus more reliably causes the hinge portion 5 to be more clearly "creased".

Figure 18:
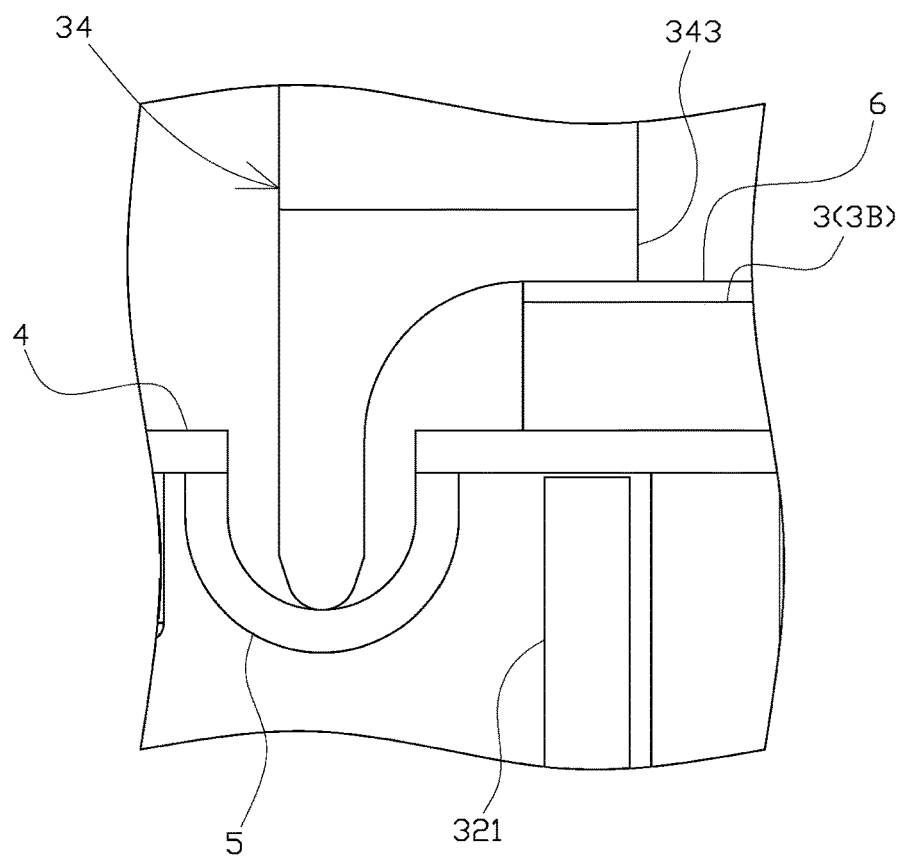
FIG. 18 is an enlarged diagram of a hinge portion and its periphery to show a heating portion according to one or more embodiments of the present invention.

(c) The above embodiments are configured to heat only the hinge portion 5 by the heating portion 341. As shown in FIG. 18 (the inner cover film 6 is shown extremely thicker than the actual state in FIG. 18), the heating portion 341 may be configured to heat not only the hinge portion 5 but a location (sealed portion 3B) of the container main body 3 at which the inner cover film 6 is mounted. This modified configuration enables the inner cover film 6 to be more firmly mounted (fused) to the container main body 3.

According to another modification, the heating portion 343 may be configured to heat the container main body 3 and the inner cover film 6 along with the hinge portion 5 and thereby mount (fuse) the inner cover film 6 to the container main body 3. In other words, the heating portion 343 may also have the functions of the sealing device 17. This modification does not need to separately provide the sealing device 17 and simplifies the mechanism of the blister packaging machine 10, thus further reducing the manufacturing cost.

The heating portion may be configured to heat only part of the sealed portion 3B or to heat the entire circumference of the sealed portion 3B.

Figure 19:
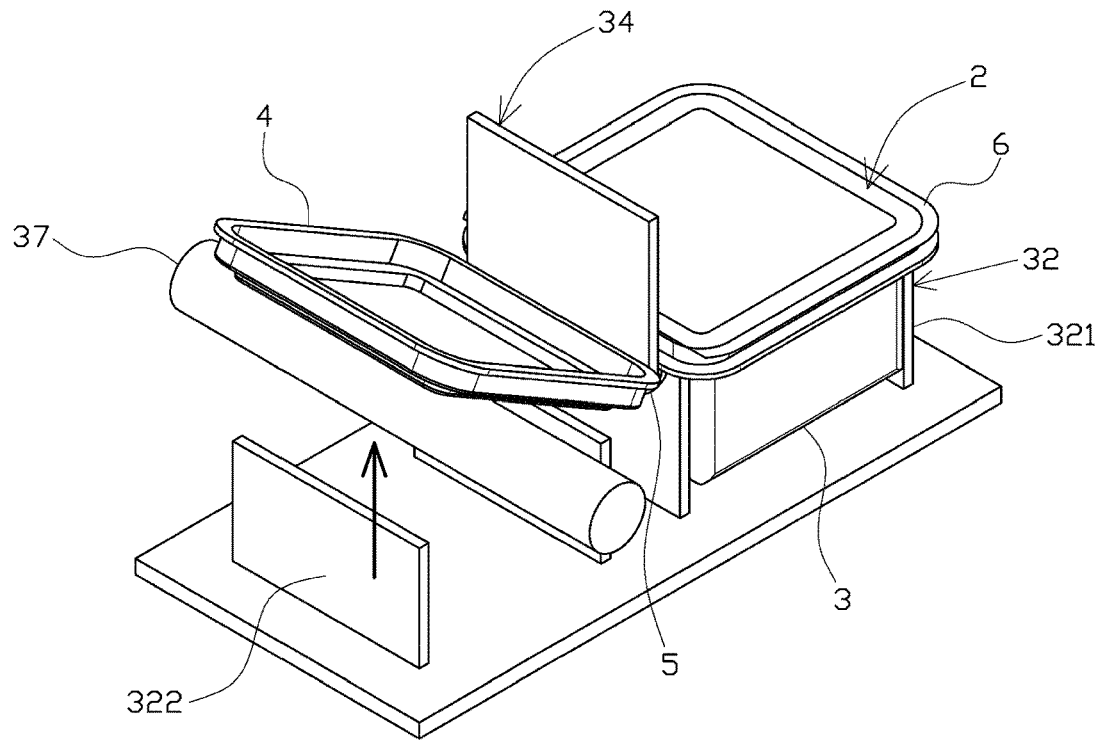
FIG. 19 is a perspective diagram illustrating a closing device when an outer cover portion is bent by vertical motion of a vertically and horizontally moving bending device according to one or more embodiments of the present invention.
Figure 20:
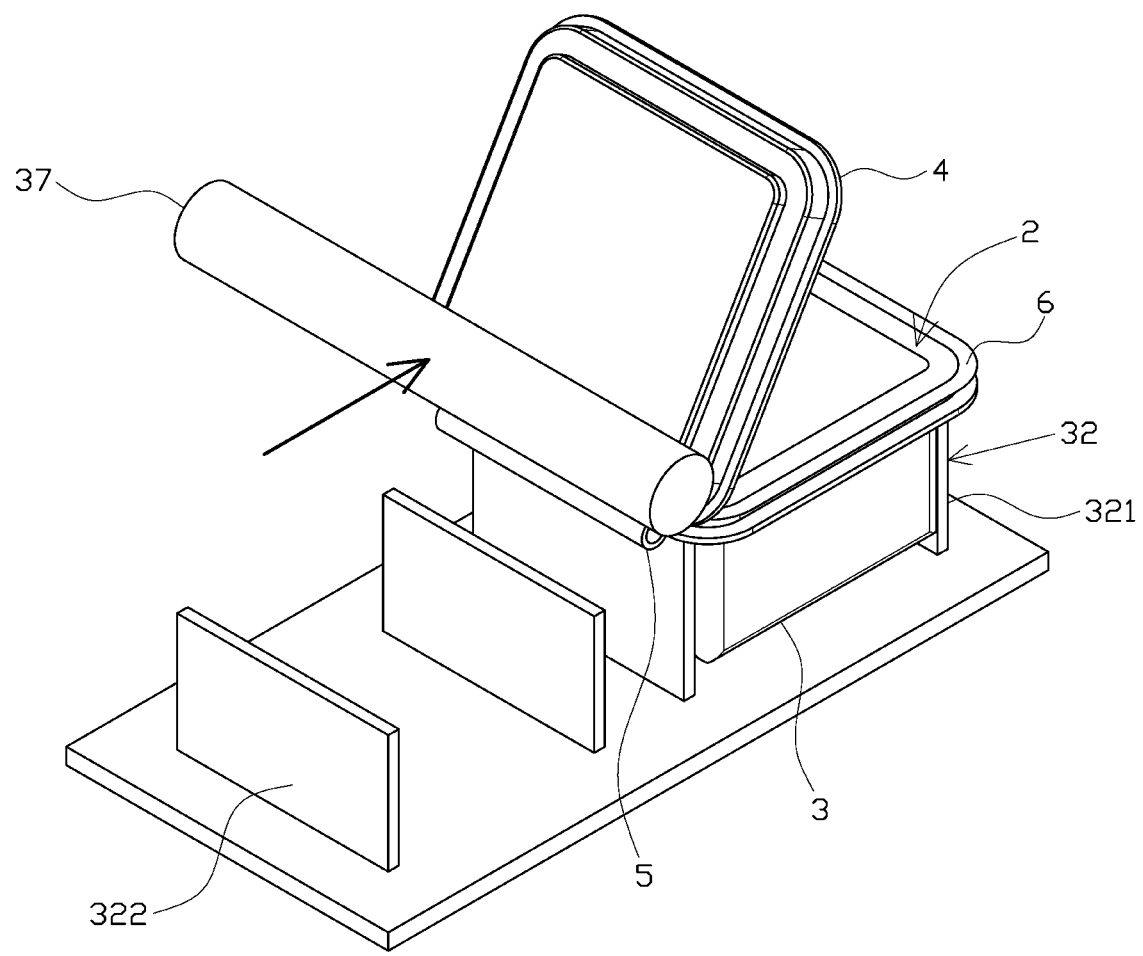
FIG. 20 is a perspective diagram illustrating the closing device when the outer cover portion is bent by horizontal motion of the vertically and horizontally moving bending device according to one or more embodiments of the present invention.

(d) A common object may be used as the moving object of the vertically moving bending unit and the moving object of the horizontally moving bending unit. For example, as shown in FIG. 19 and FIG. 20, a vertically and horizontally moving bending device 37 (corresponding to the vertically moving bending unit and the horizontally moving bending unit) may be provided to be movable both in the vertical direction and in the horizontal direction and may be configured to bend the outer cover portion 4. This modification further simplifies the mechanism and further reduces the manufacturing cost.

Figure 21:
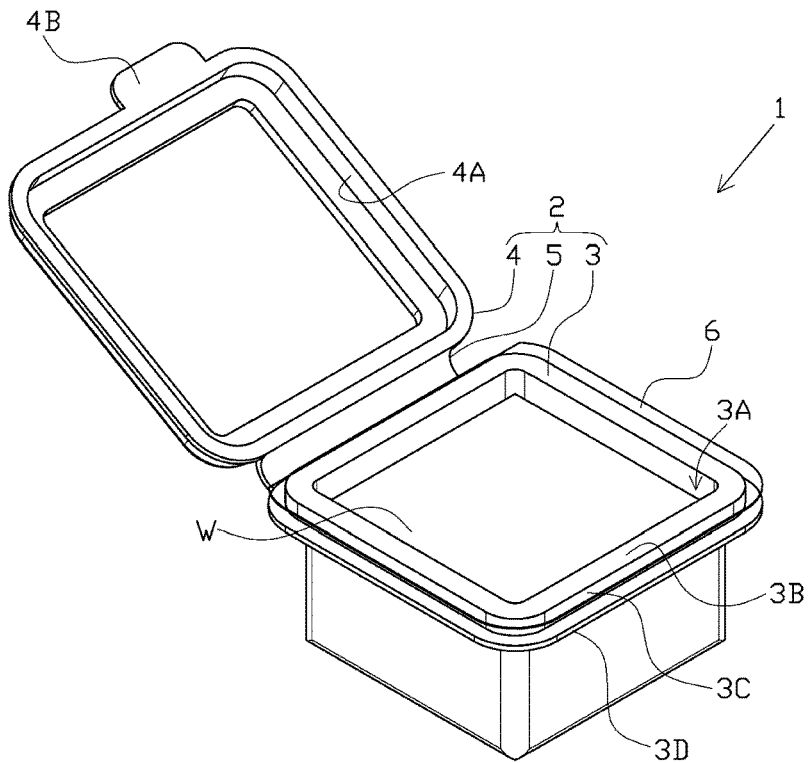
FIG. 21 is a perspective view illustrating a blister pack according to one or more embodiments of the present invention.

(e) The shape and the configuration of the blister pack 1 described in the above embodiments are only illustrative and may be changed or modified appropriately. For example, as shown in FIG. 21, part of an outer edge part of the outer cover portion 4 may be protruded to form a grip 4B that is usable to rotate the outer cover portion 4 (to open and close the opening of the container main body 3). The outer edge shape of the covered container 2 is formed to a desired shape by only punching. Even when the covered container 2 has a relatively complicated outer edge shape, this configuration ensures the good productivity.

Figure 22:
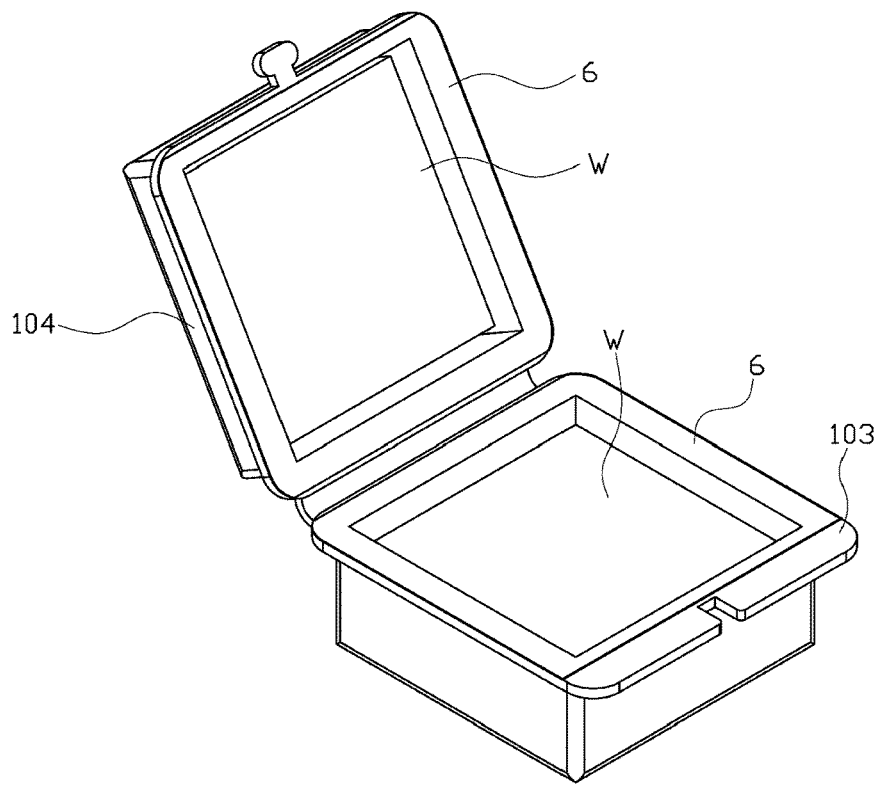
FIG. 22 is a perspective view illustrating a blister pack according to one or more embodiments of the present invention.

(f) In the above embodiments, the article W is placed only in the container main body 3. As shown in FIG. 22, however, articles W may be placed in both a container main body 103 and an outer cover portion 104. In this modification, the article W placed in the container main body 103 and the article W placed in the outer cover portion 104 may be different from each other. In this modification, an inner cover film 6 may be mounted to both the container main body 103 and the outer cover portion 104, such as to close the respective openings.

(g) A cooling unit may be provided at a position opposed to the heating portion 341 across the hinge portion 5 to cool down a corresponding bending outer part of the hinge portion 5 during heating of the hinge portion 5 by the heating portion 341. This configuration more effectively prevents thermal deformation or the like from occurring in the bending outer part of the hinge portion 5 that is especially visible in the state that the opening of the container main body 3 is closed by the outer cover portion 4 (i.e., in the state for sale or for exhibition). As a result, this further improves the appearance quality of the produced blister pack 1 (covered container 2).

(h) According to the above embodiments, the heating bending device 33 is configured to make both the vertically moving bending device 351 and the horizontally moving bending device 352 suspendable and thereby keep the outer cover portion 4 in the bent state relative to the container main body 3. According to a modification, the heating bending device 33 may be configured without the function of keeping the outer cover portion 4 in the bent state. In this modification, for example, the vertically moving bending device 351 and the horizontally moving bending device 352 may be configured to consistently bend the outer cover portion 4 at a fixed timing, and the relative angle α may be regulated with a change in amount of heat applied to the hinge portion 5 by the heating portion 341.

(i) The above embodiments are configured to change the amount of heat applied to the hinge portion 5 by changing the holding time (heating time) of the hinge portion 5 by the hold heating device 34 (heating portion 341). A modification may be configured to change the amount of heat applied to the hinge portion 5 by changing the temperature of the heating portion 341. The amount of heat applied to the hinge portion 5 may be changed by regulating both the holding time (heating time) of the hinge portion 5 and the temperature of the heating portion 341.

(j) According to the above embodiments, the heating portion 341 is configured as the hinge holding structure, and the heating portion and the hinge holding structure are integrated with each other. According to a modification, the heating portion and the hinge holding structure may be provided separately.

(k) The blister pack 1 includes the inner cover film 6 according to the above embodiments but may be configured without the inner cover film 6. In this modification, the sealing device 17 may be omitted from the blister packaging machine 10.

(l) According to the above embodiments, the blister packaging machine 10 includes the heating and softening device 12, the forming device and the punching device 18 to produce the covered container 2 in the non-bent state. A modified configuration may omit these devices and may cause a covered container 2 in the non-bent state produced in advance to be supplied to the placing device 14, the sealing device 17 and the closing device 31.

(m) The above embodiments are configured to place the article W in the container main body 3 by the placing device 14. A modified configuration may omit the placing device 14 and may cause the article W to be manually placed in the container main body 3.

(n) The materials and the specifications of the covered containers 2 (container film 7) and the inner cover film 6 described in the above embodiments are only illustrative. These materials and the like may be changed or modified appropriately.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . blister pack, 2 . . . covered container, 2F . . . covered container-corresponding part, 3 . . . container main body, 3C . . . inner fit portion (lock structure or lock), 4 . . . outer cover portion, 4A . . . outer fit portion (lock structure or lock), 5 . . . hinge portion, 6 . . . inner cover film, 7 . . . container film, 10 . . . blister packaging machine, 12 . . . heating and softening device (molding unit), 13 . . . forming device (molding unit), 14 . . . placing device (placing unit), 17 . . . sealing device (sealing unit), 18 . . . punching device (punching unit), 31 . . . closing device (covered container manufacturing device), 32 . . . support base (support structure), 33 . . . heating bending device (angle regulator), 34 . . . hold heating device (heating unit or heater, hinge holding structure or hinge pressor, bending unit), 35 . . . bending reciprocating device (bending unit), 321 . . . container support structure (motion restrictor), 341 . . . heating portion, 351 . . . vertically moving bending device (vertically moving bending unit), 352 . . . horizontally moving bending device (horizontally moving bending unit), 353 . . . outer cover holding device (closing unit or outer-cover pressor), 361, 362 . . . support plates (receiving structure or receiving plate), W . . . article

The invention claimed is:

1. A covered container manufacturing device for manufacturing a resin covered container that comprises: a container main body in which an article is placed; an outer cover portion that opens and closes an opening of the container main body; and a hinge portion that couples the container main body with the outer cover portion, wherein the container main body, the outer cover portion and the hinge portion are integrally formed, the covered container manufacturing device comprising:
an angle regulator that regulates a relative angle of the outer cover portion with respect to the container main body to a predetermined angle of less than 180 degrees, wherein
the angle regulator comprises:
a heater that comprises a heating portion that generates heat and heats the hinge portion; and
a bender that bends the outer cover portion relative to the container main body at the heated hinge portion,
wherein when the outer cover is bent over the container main body, the heater is pressed against an interior of the hinge portion and heats the interior of the hinge portion.

2. The covered container manufacturing device according to claim 1, further comprising:
a support base that supports the covered container when the opening of the container main body faces up and the outer cover portion is not bent relative to the container main body, wherein
the bender bends the outer cover portion relative to the container main body when the covered container is supported by the support base.

3. The covered container manufacturing device according to claim 2,
wherein the bender comprises a hinge pressor that presses downward on the hinge portion of the covered container supported by the support base when the outer cover portion is bent relative to the container main body.

4. The covered container manufacturing device according to claim 3,
wherein the bender keeps the outer cover portion in a bent state relative to the container main body.

5. The covered container manufacturing device according to claim 3,
wherein the bender comprises a vertically moving bender that is linearly movable in a vertical direction and presses the outer cover portion of the covered container upward to bend the outer cover portion when the hinge portion of the covered container supported by the support base is pressed downward by the hinge pressor.

6. The covered container manufacturing device according to claim 5,
wherein the bender keeps the outer cover portion in a bent state relative to the container main body.

7. The covered container manufacturing device according to claim 5,
wherein the bender comprises a horizontally moving bender that is linearly movable in a direction intersecting with the moving direction of the vertically moving bender and presses the outer cover portion bent by the vertically moving bender to bend the outer cover portion toward the opening of the container main body, and
the support base comprises a motion restrictor that restricts motion of the covered container along a pressing direction of the outer cover portion by the horizontally moving bender.

8. The covered container manufacturing device according to claim 7,
wherein the bender keeps the outer cover portion in a bent state relative to the container main body.

9. The covered container manufacturing device according to claim 2,
wherein the bender keeps the outer cover portion in a bent state relative to the container main body.

10. The covered container manufacturing device according to claim 1,
wherein the bender keeps the outer cover portion in a bent state relative to the container main body.

11. The covered container manufacturing device according to claim 10, further comprising:
a receiving plate that receives the outer cover portion at a position opposite the bender across the outer cover portion when the outer cover portion is kept in the bent state relative to the container main body by the bender.

12. A blister packaging machine for manufacturing a blister pack that comprises a resin covered container comprising: a container main body in which an article is placed; an outer cover portion that opens and closes an opening of the container main body; and a hinge portion that couples the container main body with the outer cover portion, and wherein the container main body, the outer cover portion and the hinge portion are integrally formed,
the blister packaging machine comprising:
a conveyor that conveys a strip-shaped container film in a conveying direction;
a molding device that executes a molding process of the conveyed strip-shaped container film and forms the covered container comprising the container main body;
a placing device that is disposed downstream of the molding device and places the article in the container main body;
a punching device that is disposed downstream of the placing device and punches out the covered container in the container film to produce the covered container with the outer cover portion that is not bent relative to the container main body at the hinge portion; and
the covered container manufacturing device according to claim 1 to which the covered container produced by punching by the punching device is supplied.

13. The blister packaging machine according to claim 12,
wherein the blister pack comprises a resin inner cover film attached to the container main body to close the opening of the container main body, and
the heater of the covered container manufacturing device heats the hinge portion and at least part of an attachment portion of the container main body to which the inner cover film is attached, by the heating portion.

14. The blister packaging machine according to claim 13,
wherein the covered container comprises a lock that fixes the outer cover portion to the container main body while the opening of the container main body is closed by the outer cover portion, and
the bender comprises an outer-cover pressor that presses the outer cover portion downward and causes the outer cover portion to be fixed to the container main body by the lock.

15. The blister packaging machine according to claim 12,
wherein the covered container comprises a lock that fixes the outer cover portion to the container main body while the opening of the container main body is closed by the outer cover portion, and
the bender comprises an outer-cover pressor that presses the outer cover portion downward and causes the outer cover portion to be fixed to the container main body by the lock.

* * * * *